(12) United States Patent
Kaye et al.

(10) Patent No.: US 7,807,130 B2
(45) Date of Patent: *Oct. 5, 2010

(54) FUEL PROCESSOR DEWAR AND METHODS

(75) Inventors: Ian W. Kaye, Livermore, CA (US);
Qailmas Khan, Fremont, CA (US)

(73) Assignee: UltraCell Corporation, Livermore, CA (US)

( * ) Notice: Subject to any disclaimer, the term of this patent is extended or adjusted under 35 U.S.C. 154(b) by 320 days.

This patent is subject to a terminal disclaimer.

(21) Appl. No.: 11/830,181

(22) Filed: Jul. 30, 2007

(65) Prior Publication Data

US 2007/0294941 A1       Dec. 27, 2007

Related U.S. Application Data

(63) Continuation of application No. 10/877,767, filed on Jun. 25, 2004, now Pat. No. 7,276,096.

(60) Provisional application No. 60/482,996, filed on Jun. 27, 2003, provisional application No. 60/483,416, filed on Jun. 27, 2003.

(51) Int. Cl.
   *C01B 3/02*      (2006.01)
(52) U.S. Cl. .................................... 423/648.1
(58) Field of Classification Search ........................ None
   See application file for complete search history.

(56) References Cited

U.S. PATENT DOCUMENTS

| 3,119,671 | A | 1/1964 | Koniewiez et al. |
| 3,541,729 | A | 11/1970 | Dantowitz |
| 3,578,952 | A | 5/1971 | Boose |
| 3,595,628 | A | 7/1971 | Connor et al. |

(Continued)

FOREIGN PATENT DOCUMENTS

DE        19841993        3/2000

(Continued)

OTHER PUBLICATIONS

Conduction General Theory, Efunda, Feb. 2002.*

(Continued)

*Primary Examiner*—Melvin C Mayes
*Assistant Examiner*—Stefanie Cohen
(74) *Attorney, Agent, or Firm*—Beyer Law Group LLP

(57) ABSTRACT

Described herein is a fuel processor that produces hydrogen from a fuel source. The fuel processor comprises a reformer and burner. The reformer includes a catalyst that facilitates the production of hydrogen from the fuel source. Voluminous reformer chamber designs are provided that increase the amount of catalyst that can be used in a reformer and increase hydrogen output for a given fuel processor size. The burner provides heat to the reformer. One or more burners may be configured to surround a reformer on multiple sides to increase thermal transfer to the reformer. Dewars are also described that increase thermal management of a fuel processor and increase burner efficiency. A dewar includes one or more dewar chambers that receive inlet process gas or liquid before a burner receives the process gas or liquid. The dewar is arranged such that process gas or liquid passing through the dewar chamber intercepts heat generated in the burner before the heat escapes the fuel processor.

20 Claims, 13 Drawing Sheets

U.S. PATENT DOCUMENTS

| | | | |
|---|---|---|---|
| 4,335,023 A | 6/1982 | Dettling et al. | |
| 4,522,894 A | 6/1985 | Hwang et al. | |
| 4,909,808 A * | 3/1990 | Voecks | 48/94 |
| 5,081,095 A | 1/1992 | Bedford et al. | |
| 5,145,491 A | 9/1992 | Schmitt et al. | |
| 5,209,906 A | 5/1993 | Watkins et al. | |
| 5,525,436 A | 6/1996 | Savinell et al. | |
| 5,534,328 A | 7/1996 | Ashmead et al. | |
| 5,601,938 A | 2/1997 | Mayer et al. | |
| 5,611,214 A | 3/1997 | Wegeng et al. | |
| 5,641,585 A | 6/1997 | Lessing et al. | |
| 5,676,911 A | 10/1997 | Baumert et al. | |
| 5,716,727 A | 2/1998 | Savinell et al. | |
| 5,733,347 A | 3/1998 | Lesieur | |
| 5,789,093 A | 8/1998 | Malhi | |
| 5,811,062 A | 9/1998 | Wegeng et al. | |
| 5,858,314 A | 1/1999 | Hsu et al. | |
| 5,961,930 A | 10/1999 | Chatterjee et al. | |
| 5,961,932 A | 10/1999 | Ghosh et al. | |
| 6,077,620 A | 6/2000 | Pettit | |
| 6,080,501 A | 6/2000 | Kelley et al. | |
| 6,193,501 B1 | 2/2001 | Masel et al. | |
| 6,200,536 B1 | 3/2001 | Tonkovich et al. | |
| 6,232,005 B1 | 5/2001 | Pettit | |
| 6,238,815 B1 | 5/2001 | Skala et al. | |
| 6,245,214 B1 | 6/2001 | Rehg et al. | |
| 6,268,077 B1 | 7/2001 | Kelley et al. | |
| 6,280,864 B1 * | 8/2001 | Towler et al. | 429/17 |
| 6,312,846 B1 | 11/2001 | Marsh | |
| 6,406,808 B1 | 6/2002 | Pratt et al. | |
| 6,415,860 B1 | 7/2002 | Kelly et al. | |
| 6,423,434 B1 | 7/2002 | Pratt et al. | |
| 6,460,733 B2 | 10/2002 | Acker | |
| 6,465,119 B1 | 10/2002 | Koripella et al. | |
| 6,470,569 B1 | 10/2002 | Lippert et al. | |
| 6,479,920 B1 | 11/2002 | Lal et al. | |
| 6,537,352 B2 | 3/2003 | Edlund et al. | |
| 6,537,506 B1 | 3/2003 | Schwalbe et al. | |
| 6,541,676 B1 | 4/2003 | Franz et al. | |
| 6,569,553 B1 | 5/2003 | Koripella et al. | |
| 6,613,972 B2 | 9/2003 | Cohen et al. | |
| 6,638,654 B2 | 10/2003 | Jankowksi et al. | |
| 6,645,443 B1 | 11/2003 | Vogel et al. | |
| 6,660,423 B2 | 12/2003 | Neutzler et al. | |
| 6,673,130 B2 | 1/2004 | Jankowski et al. | |
| 6,673,742 B2 | 1/2004 | Abdo et al. | |
| 6,677,070 B2 | 1/2004 | Kearl | |
| 6,696,195 B2 | 2/2004 | Pavio et al. | |
| 6,727,479 B2 | 4/2004 | Villa et al. | |
| 6,746,960 B2 | 6/2004 | Goodman | |
| 6,753,036 B2 | 6/2004 | Jankowski et al. | |
| 6,770,106 B1 | 8/2004 | Okomato et al. | |
| 6,777,118 B2 | 8/2004 | Shioya | |
| 6,810,899 B2 | 11/2004 | Franz et al. | |
| 6,815,110 B2 | 11/2004 | Marsh | |
| 6,821,666 B2 | 11/2004 | Morse et al. | |
| 6,824,905 B2 | 11/2004 | Shioya et al. | |
| 6,835,488 B2 | 12/2004 | Sasahara et al. | |
| 6,872,486 B2 | 3/2005 | Srinivasan et al. | |
| 6,878,480 B2 | 4/2005 | Ruhl et al. | |
| 6,887,587 B2 * | 5/2005 | Allen et al. | 428/622 |
| 6,911,193 B2 | 6/2005 | Allison et al. | |
| 6,913,998 B2 | 7/2005 | Jankowski et al. | |
| 6,916,565 B2 | 7/2005 | Shioya | |
| 6,921,603 B2 | 7/2005 | Morse et al. | |
| 6,926,852 B2 | 8/2005 | Satou et al. | |
| 6,932,958 B2 | 8/2005 | Wangerow et al. | |
| 6,939,632 B2 | 9/2005 | Arana et al. | |
| 6,960,235 B2 | 11/2005 | Morse et al. | |
| 6,960,403 B2 | 11/2005 | Morse et al. | |
| 7,014,835 B2 | 3/2006 | Mathias et al. | |
| 7,056,477 B1 | 6/2006 | Schwalbe et al. | |
| 7,074,511 B2 | 7/2006 | Becerra et al. | |
| 7,077,643 B2 | 7/2006 | Holladay et al. | |
| 7,115,148 B2 | 10/2006 | Wheeldon et al. | |
| 7,122,261 B2 | 10/2006 | Morse et al. | |
| 7,169,367 B2 | 1/2007 | Takeyama et al. | |
| 7,175,817 B2 | 2/2007 | Kawamura et al. | |
| 7,186,352 B2 | 3/2007 | Morse et al. | |
| 7,189,471 B2 | 3/2007 | Jankowksi et al. | |
| 7,214,251 B2 | 5/2007 | Oh et al. | |
| 7,264,897 B2 | 9/2007 | Sato et al. | |
| 7,276,096 B2 | 10/2007 | Kaye et al. | |
| 7,297,426 B2 | 11/2007 | Sakai et al. | |
| 2001/0029735 A1 * | 10/2001 | Miura et al. | 60/512 |
| 2001/0031592 A1 * | 10/2001 | Schulz | 442/203 |
| 2002/0131915 A1 | 9/2002 | Shore et al. | |
| 2002/0131921 A1 * | 9/2002 | Ishikawa | 422/198 |
| 2002/0192537 A1 | 12/2002 | Ren | |
| 2003/0077490 A1 | 4/2003 | Reinke et al. | |
| 2003/0105172 A1 | 6/2003 | Bowe et al. | |
| 2003/0121906 A1 | 7/2003 | Abbott et al. | |
| 2003/0159354 A1 | 8/2003 | Edlund et al. | |
| 2003/0194363 A1 | 10/2003 | Koripella | |
| 2004/0031592 A1 | 2/2004 | Mathias et al. | |
| 2004/0040281 A1 | 3/2004 | Yamaguchi et al. | |
| 2004/0043263 A1 | 3/2004 | Takeyama et al. | |
| 2004/0048128 A1 | 3/2004 | Jankowksi et al. | |
| 2004/0063797 A1 | 4/2004 | Aasberg-Petersen et al. | |
| 2004/0065013 A1 | 4/2004 | DeVries | |
| 2004/0105789 A1 | 6/2004 | Yamamoto | |
| 2004/0166395 A1 | 8/2004 | Jankowski et al. | |
| 2004/0228211 A1 | 11/2004 | Koripella et al. | |
| 2004/0261379 A1 | 12/2004 | Bruun et al. | |
| 2005/0008909 A1 | 1/2005 | Kaye et al. | |
| 2005/0008911 A1 | 1/2005 | Kaye | |
| 2005/0011125 A1 | 1/2005 | Kaye et al. | |
| 2005/0014040 A1 | 1/2005 | Kaye | |
| 2005/0115889 A1 | 6/2005 | Schaevitz et al. | |
| 2005/0186455 A1 | 8/2005 | Kaye et al. | |
| 2006/0107594 A1 | 5/2006 | Kuwaba | |
| 2006/0127719 A1 | 6/2006 | Brantley et al. | |
| 2006/0134470 A1 | 6/2006 | Kaye et al. | |
| 2008/0118796 A1 | 5/2008 | Brantley et al. | |

FOREIGN PATENT DOCUMENTS

| | | |
|---|---|---|
| JP | 06-310166 A | 11/1994 |
| JP | 2003048701 | 2/2003 |
| JP | 2003290649 | 10/2003 |
| JP | 2003290653 | 10/2003 |
| JP | 2003340273 | 12/2003 |
| JP | 2004057920 | 2/2004 |
| WO | WO 00/45457 | 8/2000 |
| WO | WO0147800 | 7/2001 |
| WO | WO02/19452 | 3/2002 |
| WO | WO 02/059993 | 8/2002 |
| WO | WO 02/093665 | 11/2002 |
| WO | WO 02/103832 | 12/2002 |
| WO | WO 02/103878 | 12/2002 |
| WO | WO03/082460 | 10/2003 |
| WO | WO03/083984 | 10/2003 |
| WO | WO 2004/030805 | 4/2004 |
| WO | WO2004/037406 | 5/2004 |

OTHER PUBLICATIONS

Office Action dated Dec. 22, 2008 from U.S. Appl. No. 11/772,689.
Office Action dated Aug. 8, 2008 from U.S. Appl. No. 10/877,044.
Office Action dated Jun. 3, 2008 from Indian Application No. 16/KOLNP/2006.
Office Action dated Nov. 6, 2008 from U.S. Appl. No. 11/830,177.
Office Action dated Oct. 15, 2008 from U.S. Appl. No. 11/313,252.
Office Action dated Jan. 25, 2008 from U.S. Appl. No. 10/877,804.

Notice of Allowance dated Sep. 25, 2008 from U.S. Appl. No. 10/877,804.
Office Action dated Apr. 16, 2008 from U.S. Appl. No. 11/313,252.
Office Action dated Jan. 25, 2008 from U.S. Appl. No. 10/877,804.
Office Action dated Apr. 16, 2008 from U.S. Appl. No. 11/313,252.
Final Rejection dated Jan. 24, 2008 from U.S. Appl. No. 10/877,044.
International Search Report and Written Opinion for PCT Application No. PCT/US05/46127 dated Oct. 10, 2006.
Office Action dated Aug. 22, 2007 from U.S. Appl. No. 10/877,804.
Notice of Allowance dated Jun. 19, 2007 in U.S. Appl. No. 10/877,767.
Office Action dated Jan. 4, 2007 in U.S. Appl. No. 10/877,767.
S. Ahmed et al., "Catalytic Partial Oxidation Reforming of Hydrocarbon Fuels", Nov. 16-19, 1998, 1998 Fuel Cell Seminar, Palm Springs, CA.
A.R. Boccaccini et al., "Electrophoretic Deposition of Nanoceramic Particles onto Electrically Conducting Fibre Fabrics", Sep. 21-24, 1998, 43$^{rd}$ International Scientific Colloquium, Technical University of Ilmenau.
J. Bostaph et al., "1W Direct Methanol Fuel Cell System as a Desktop Charger", Oct. 14, 2002, Motorola Labs, Tempe, AZ.
K. Brooks et al., "Microchannel Fuel Processing, Fuel Cells for Transportation/Fuels for Fuel Cells", May 6-10, 2002, 2002 Annual Program/Lab R&D Review, Pacific Northwest National Laboratory.
M.J. Castaldi et al., "A Compact, Lightweight, Fast-Response Preferential Oxidation Reactor for PEM Automotive Fuel Cell Applications", Sep. 6, 2002, Precision Combustion, Inc., North Haven, CT.
S. Ehrenberg et al., "One Piece Bi-Polar (OPB) Plate with Cold Plate Cooling", Dec. 13, 2002, Session PEM R&D II (2A), Dais Analytic—Rogers.
T.M. Floyd et al., "Liquid-Phase and Multi-Phase Microreactors for Chemical Synthesis", Jun. 1999, Massachusetts Institute of Technology, Cambridge, MA.
A.J. Franz et al., "High Temperature Gas Phase Catalytic and Membrane Reactors", Jun. 1999, Massachusetts Institute of Technology, Cambridge, MA.
J.D. Holladay et al., "Miniature Fuel Processors for Portable Fuel Cell Power Supplies", Nov. 26, 2002, Battelle Pacific Northwest Division, Richland, WA.
S.W. Janson et al., "MEMS, Microengineering and Aerospace Systems", 1999, The American Institute of Aeronautics and Astronautics, Inc.
J. Kaschmitter et al., "Micro-Fabricated Methanol/Water Reformers for Small PEM Fuel Cell Systems", Jul. 21-24, 2003, 8$^{th}$ Electrochemical Power Sources R&D Symposium, Portsmouth, VA.
K. Keegan et al., "Analysis for a Planar Solid Oxide Fuel Cell Based Automotive Auxiliary Power Unit", Mar. 4-7, 2002, SAE 2002 World Congress, Detroit, MI.
K. Kempa et al., "Photonic Crystals Based on Periodic Arrays of Aligned Carbon Nanotubes", Oct. 3, 2002, Nano Letters 2003, vol. 3. No. 1, 13-18.
R. Kumar et al., "Solid Oxide Fuel Cell Research at Argonne National Laboratory", Mar. 29-30, 2001, 2$^{nd}$ Solid Sate Energy Conversion Alliance Workshop, Arlington, VA.
S.H. Lee et al., "Removal of Carbon Monoxide from Reformate for Polymer Electrolyte Fuel Cell Application", Nov. 16-19, 1998, 1998 Fuel Cell Seminar, Palm Springs, CA.
Q. Li et al., "The CO Poisoning Effect in PEMFCs Operational at Temperatures up to 200° C", 2003, Journal of The Electrochemical Society, 150 (12) A1599-A1605.
D. Myers et al., "Alternative Water-Gas Shift Catalysts", Jun. 7-8, 2000, 2000 Annual National Laboratory R&D Meeting, DOE Fuel Cells for Transportation Program, Argonne National Laboratory.
D.R. Palo et al., "Development of a Soldier-Portable Fuel Cell Power System, Part I: A Bread-Board Methanol Fuel Processor", 2002, Journal of Power Sources 108 (2002) 28-34.

A. Pattekar et al., "A Microreactor for In-situ Hydrogen Production by Catalytic Methanol Reforming", May 27-30, 2001, Proceedings of the 5$^{th}$ International Conference on Microreaction Technology.
A. Pattekar et al., "Novel Microfluidic Interconnectors for High Temperature and Pressure Applications", 2003, Journal of Micromechanics and Microengineering, 13, 337-345.
D. Prater et al., "Systematic Examination of a Direct Methanol-Hydrogen Peroxide Fuel Cell", Sep. 22, 2001, Swift Enterprises, Ltd., Lafayette, IN.
W. Ruettinger et al., "A New Generation of Water Gas Shift Catalysts for Fuel Cell Applications", 2003, Journal of Power Sources, 118, 61-65.
O. Savadogo et al., Hydrogen/Oxygen Polymer Electrolyte Membrane Fuel Cell (PEMFC) Based on Acid-Doped Polybenzimidazole (PBI), 2000, Journal of New Materials for Electrochemical Systems, 3, 345-349.
R.F. Savinell et al., "High Temperature Polymer Electrolyte for PEM Fuel Cells", Sep. 4, 2002, Department of Chemical Engineering, Case Western Reserve University.
R. Srinivasan et al., "Micromachined Reactors for Catalytic Partial Oxidation Reactions", Nov. 1997, AIChe Journal, vol. 43, No. 11, 3059-3069.
S. Swartz et al., "Ceria-Based Water-Gas-Shift Catalysts", Aug. 1, 2003, NexTech Materials, Ltd., Wolrthington, OH.
S. Tasic et al., "Multilayer Ceramic Processing of Microreactor Systems", Oct. 14, 2002, Motorola Labs, Tempe, AZ.
V. Tomašić et al., "Development of the Structured Catalysts for the Exhaust Gas Treatment", 2001, Chem. Biochem. Eng. Q. 15 (3), 109-115.
Tiax LLC, "Advanced Hydrogen Storage: A System's Perspective and Some Thoughts on Fundamentals", Aug. 14-15, 2002, Presentation for DOE Workshop on Hydrogen Storage, Cambridge, MA.
Wan et al., "Catalyst Preparation: Catalytic Converter", Feb. 19, 2003, www.insightcentral.net/encatalytic.html.
J. Zalc et al., "Are Noble Metal-Based Water-Gas Shift Catalysts Practical for Automotive Fuel Processing?", 2002, Journal of Catalysis, 206, 169-171.
J. Zizelman et al., "Solid-Oxide Fuel Cell Auxiliary Power Unit: A Paradigm Shift in Electric Supply for Transportation", undated, Delphi Automotive Systems.
"Methanol-Powered Laptops—Cleared for Take-Off", www.silicon.com, Oct. 7, 2002.
Melissa Funk, "Methanol Fuel Quality Specification Study for Proton Exchange Membrane Fuel Cells, Final Report", XCELLSIS, Feb. 2002, 65 pages.
Dr. Detlef zur Megede et al., "MFCA Research Document, Complete", Methanol Fuel Cell Alliance, Sep. 2000, 242 pages.
International Search Report dated Jul. 8, 2005, from International Application No. PCT/US04/20299.
Office Action dated Aug. 5, 2009 in U.S. Appl. No. 12/276,129.
Notice of Allowance dated Jul. 13, 2009 in U.S. Appl. No. 10/877,044.
Office Action dated Apr. 24, 2009 in U.S. Appl. No. 11/830,177.
Office Action dated Apr. 24, 2009 in U.S. Appl. No. 11/877,044.
Office Action dated Mar. 30, 2009 in U.S. Appl. No. 11/313,252.
International Search Report dated Oct. 22, 2008 from PCT Application No. PCT/US07/17790.
Written Opinion of International Search Authority dated Oct. 22, 2008 from PCT Application No. PCT/US07/17790.
Office Action dated Dec. 24, 2008 from U.S. Appl. No. 11/835,747.
Office Action dated Apr. 29, 2009 from U.S. Appl. No. 11/772,689.
Office Action dated Feb. 17, 2010 in U.S. Appl. No. 11/830,177.
Office Action dated Dec. 31, 2009 in U.S. Appl. No. 11/313,252.
Office Action dated Dec. 7, 2009 in U.S. Appl. No. 11/772,689.
Office Action dated Oct. 28, 2009 in U.S. Appl. No. 12/346,654.
Office Action dated Aug. 18, 2009 in U.S. Appl. No. 11/830,177.
Office Action dated Oct. 14 2009 in U.S. Appl. No. 11/313,252.

* cited by examiner

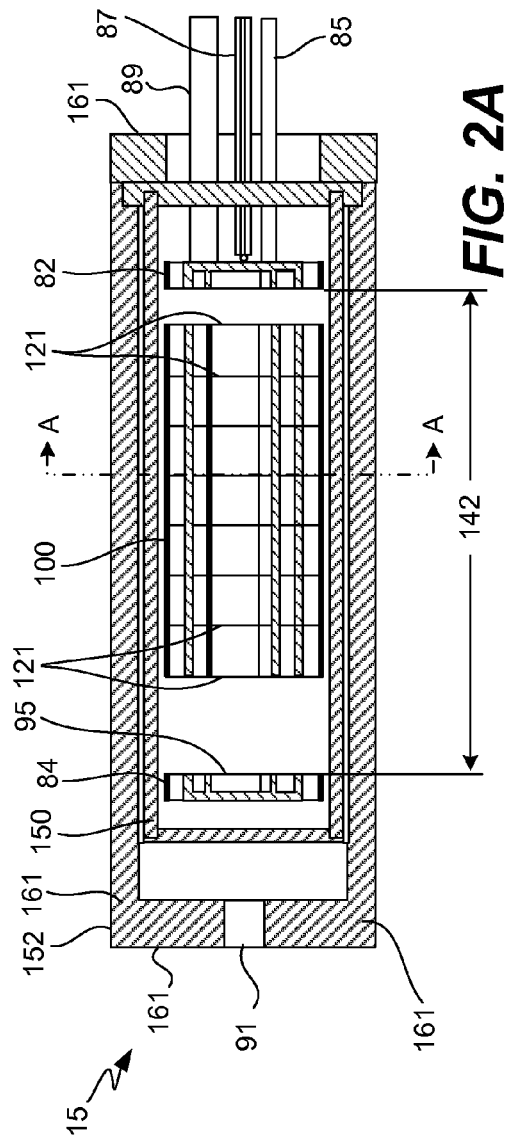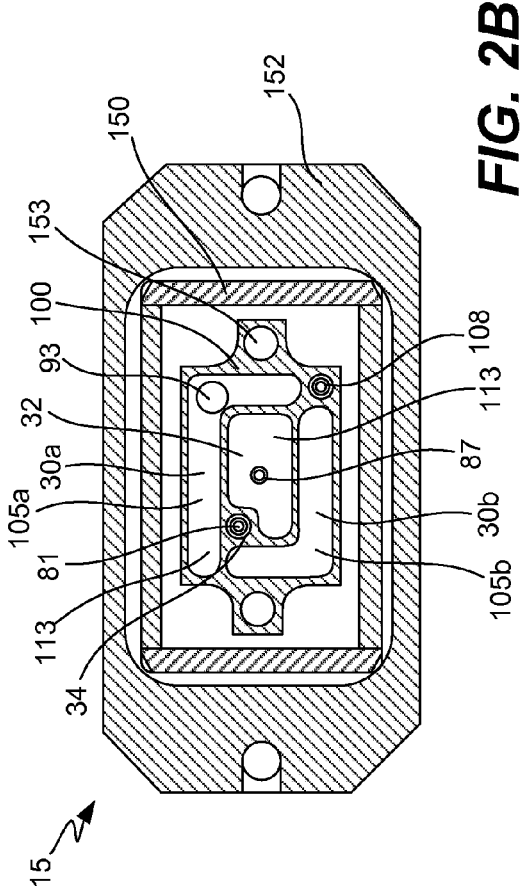

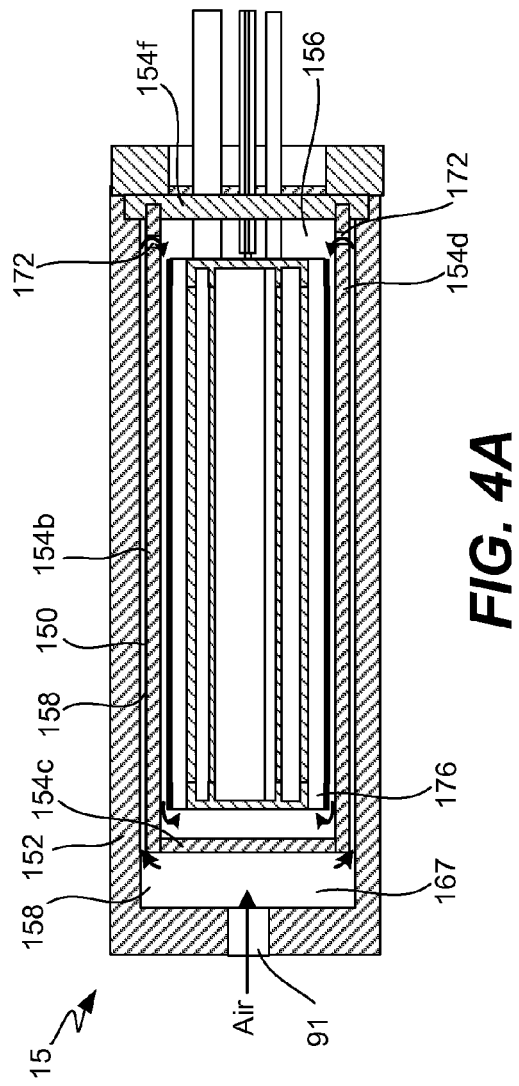
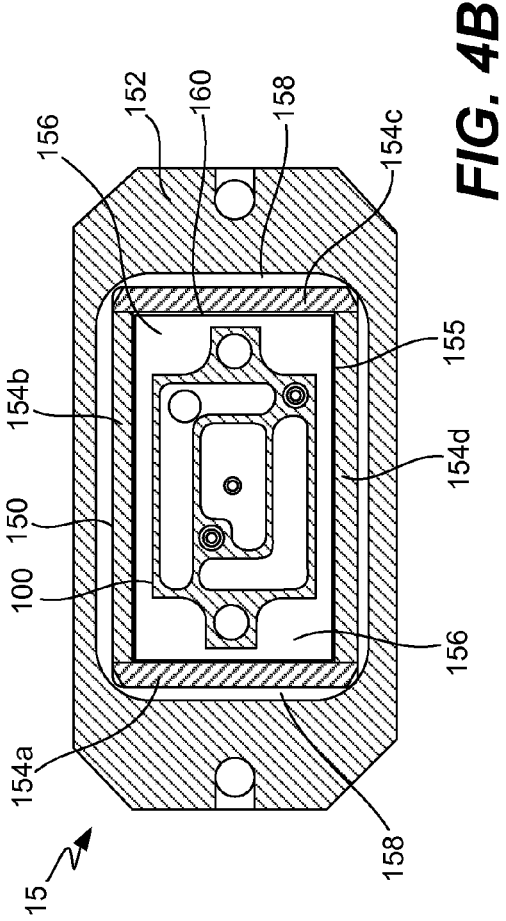

FUEL PROCESSOR DEWAR AND METHODS

CROSS-REFERENCE TO RELATED APPLICATIONS

This application is a continuation and claims priority under 35 U.S.C. §120 from U.S. patent application Ser. No. 10/877,767, filed Jun. 25, 2004 and entitled, "FUEL PROCESSOR DEWAR AND METHODS," which claims priority under 35 U.S.C. §119(e) from a) U.S. Provisional Patent Application No. 60/482,996 filed Jun. 27, 2003, and b) U.S. Provisional Patent Application No. 60/483,416 filed Jun. 27, 2003; each of these patent applications is incorporated by reference herein in its entirety for all purposes.

BACKGROUND OF THE INVENTION

The present invention relates to fuel cell technology. In particular, the invention relates to fuel processors that generate hydrogen and are suitable for use in portable applications.

A fuel cell electrochemically combines hydrogen and oxygen to produce electricity. The ambient air readily supplies oxygen. Hydrogen provision, however, calls for a working supply. Gaseous hydrogen has a low energy density that reduces its practicality as a portable fuel. Liquid hydrogen, which has a suitable energy density, must be stored at extremely low temperatures and high pressures, making storing and transporting liquid hydrogen burdensome.

A reformed hydrogen supply processes a fuel source to produce hydrogen. The fuel source acts as a hydrogen carrier. Currently available hydrocarbon fuel sources include methanol, ethanol, gasoline, propane and natural gas. Liquid hydrocarbon fuel sources offer high energy densities and the ability to be readily stored and transported. A fuel processor reforms the hydrocarbon fuel source and to produce hydrogen.

Fuel cell evolution so far has concentrated on large-scale applications such as industrial size generators for electrical power back-up. Consumer electronics devices and other portable electrical power applications currently rely on lithium ion and similar battery technologies. Fuel processors for portable applications such as electronics would be desirable but are not yet commercially available. In addition, techniques that reduce fuel processor size or increase fuel processor efficiency would be highly beneficial.

SUMMARY OF THE INVENTION

The present invention relates to a fuel processor that produces hydrogen from a fuel source. The fuel processor comprises a reformer and burner. The reformer includes a catalyst that facilitates the production of hydrogen from the fuel source. Voluminous reformer chamber designs are provided that increase the amount of catalyst that can be used in a reformer and increase hydrogen output for a given fuel processor size. The burner provides heat to the reformer. One or more burners may be configured to surround a reformer on multiple sides to increase thermal transfer to the reformer.

Dewars are also described that improve thermal management of a fuel processor by reducing heat loss and increasing burner efficiency. A dewar includes one or more dewar chambers that receive inlet process gases or liquids before a reactor receives them. The dewar is arranged such that inlet process gases or liquids passing through the dewar chamber intercepts heat generated in the burner before the heat escapes the fuel processor. Passing inlet process gases or liquids through a dewar chamber in this manner performs three functions: a) active cooling of dissipation of heat generated in burner before is reaches outer portions of the fuel processor, and b) heating of the air before receipt by the burner, and c) absorbing and recycling heat back into the burner increasing burner efficiency. When the burner relies on catalytic combustion to produce heat, heat generated in the burner warms cool process gases or liquids in the burner according to the temperature of the process gases or liquids. This steals heat from the reformer, reduces heating efficiency of a burner and typically results in greater consumption of the fuel source. The dewar thus pre-heats the incoming process gases or liquids before burner arrival so the burner passes less heat to the process gases or liquids that would otherwise transfer to the reformer.

In one aspect, the present invention relates to a fuel processor for producing hydrogen from a fuel source. The fuel processor comprises a reformer configured to receive the fuel source, configured to output hydrogen, and including a catalyst that facilitates the production of hydrogen. The fuel processor also comprises a boiler configured to heat the fuel source before the reformer receives the fuel source. The fuel processor further comprises at least one burner configured to provide heat to the reformer and disposed annularly about the reformer. The fuel processor may also comprise a boiler that heats the burner liquid fuel feed.

In another aspect, the present invention relates to a fuel processor for producing hydrogen from a fuel source. The fuel processor comprises a reformer configured to receive the fuel source, configured to output hydrogen, including a catalyst that facilitates the production of hydrogen. The reformer also includes a reformer chamber having a volume greater than about 0.1 cubic centimeters and less than about 50 cubic centimeters and is characterized by a cross sectional width and a cross sectional height that is greater than one-third the cross sectional width. The fuel processor also comprises a boiler configured to heat the fuel source before the reformer receives the fuel source. The fuel processor further comprises at least one burner configured to provide heat to the reformer.

In yet another aspect, the present invention relates to a fuel processor for producing hydrogen from a fuel source. The fuel processor comprises a reformer configured to receive the hydrogen fuel source, configured to output hydrogen, and including a catalyst that facilitates the production of hydrogen. The fuel processor also comprises a burner that is configured to provide heat to the reformer. The fuel processor further comprises a dewar that at least partially contains the reformer and the burner and includes a set of dewar walls that form a dewar chamber that is configured to receive an inlet process gas or liquid before the burner receives the inlet process gas or liquid. The fuel processor additionally comprises a housing including a set of housing walls that at least partially contain the dewar and provide external mechanical protection for the reformer and the burner.

In still another aspect, the present invention relates to a method for managing heat in a fuel processor. The fuel processor comprises a burner, a reformer and a dewar that at least partially contains the burner. The method comprises generating heat in the burner. The method also comprises passing an inlet process gas or liquid through a dewar chamber. The method further comprises heating the inlet process gas or liquid in the dewar chamber using heat generated in the burner.

In another aspect, the present invention relates to a method for generating hydrogen in a fuel processor. The fuel processor comprises a burner, a reformer and a dewar that at least partially contains the burner and reformer. The method comprises generating heat in the burner. The method also comprises passing an inlet process gas or liquid through a dewar chamber. The method further comprises heating the inlet process gas or liquid in the dewar chamber using heat generated in the burner. The method additionally comprises supplying the inlet process gas or liquid to the burner after it has been heated in the dewar chamber. The method also comprises transferring heat generated in the burner to the reformer. The method further comprises reforming a fuel source to produce hydrogen.

These and other features and advantages of the present invention will be described in the following description of the invention and associated figures.

BRIEF DESCRIPTION OF THE DRAWINGS

FIG. 2A illustrates a cross-sectional side view of a fuel processor used in the fuel cell system of FIG. 1A in accordance with one embodiment of the present invention.

FIG. 2B illustrates a cross-sectional front view of the fuel processor used in the fuel cell system of FIG. 1A taken through a mid-plane of fuel processor.

FIG. 4A illustrates a side cross-sectional view of the fuel processor of FIG. 2A and movement of air created by a dewar in accordance with one embodiment of the present invention.

FIG. 4B illustrates a front cross-sectional view of the fuel processor of FIG. 2A and demonstrates thermal management benefits gained by the dewar.

DETAILED DESCRIPTION OF THE PREFERRED EMBODIMENTS

The present invention is described in detail with reference to a few preferred embodiments as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 1A:
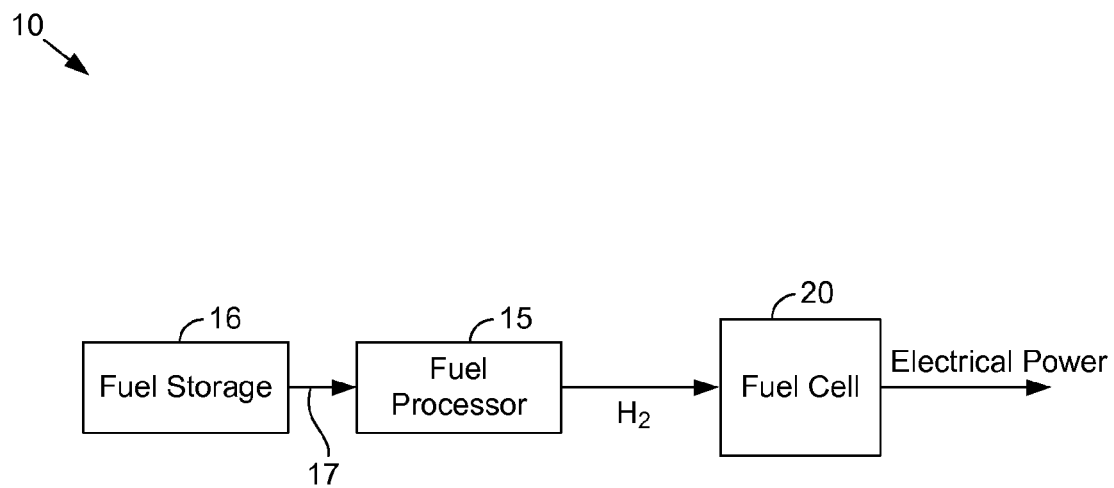
FIG. 1A illustrates a fuel cell system for producing electrical energy in accordance with one embodiment of the present invention.

FIG. 1A illustrates a fuel cell system 10 for producing electrical energy in accordance with one embodiment of the present invention. Fuel cell system 10 comprises storage device 16, fuel processor 15 and fuel cell 20.

A 'reformed' hydrogen supply processes a fuel source to produce hydrogen. As shown, the reformed hydrogen supply comprises a fuel processor 15 and a fuel source storage device 16. Storage device 16 stores fuel source 17, and may include a portable and/or disposable fuel cartridge. A disposable cartridge offers instant recharging to a consumer. In one embodiment, the cartridge includes a collapsible bladder within a hard plastic dispenser case. A separate fuel pump typically controls fuel source 17 flow from storage device 16. If system 10 is load following, then a control system meters fuel source 17 to deliver fuel source 17 to processor 15 at a flow rate determined by the required power level output of fuel cell 20.

Fuel source 17 acts as a carrier for hydrogen and can be processed to separate hydrogen. Fuel source 17 may include any hydrogen bearing fuel stream, hydrocarbon fuel or other hydrogen fuel source such as ammonia. Currently available hydrocarbon fuel sources 17 suitable for use with the present invention include gasoline, $C_1$ to $C_4$ hydrocarbons, their oxygenated analogues and/or their combinations, for example. Several hydrocarbon and ammonia products may also produce a suitable fuel source 17. Liquid fuel sources 17 offer high energy densities and the ability to be readily stored and shipped. Storage device 16 may contain a fuel mixture. When the fuel processor 15 comprises a steam reformer, storage device 16 may contain a fuel mixture of a hydrocarbon fuel source and water. Hydrocarbon fuel source/water fuel mixtures are frequently represented as a percentage fuel source in water. In one embodiment, fuel source 17 comprises methanol or ethanol concentrations in water in the range of 1%-99.9%. Other liquid fuels such as butane, propane, gasoline, military grade "JP8" etc. may also be contained in storage device 16 with concentrations in water from 5-100%. In a specific embodiment, fuel source 17 comprises 67% methanol by volume.

Fuel processor 15 processes the hydrocarbon fuel source 17 and outputs hydrogen. A hydrocarbon fuel processor 15 heats and processes a hydrocarbon fuel source 17 in the presence of a catalyst to produce hydrogen. Fuel processor 15 comprises a reformer, which is a catalytic device that converts a liquid or gaseous hydrocarbon fuel source 17 into hydrogen and carbon dioxide. As the term is used herein, reforming refers to the process of producing hydrogen from a fuel source. Fuel processor 15 may output either pure hydrogen or a hydrogen bearing gas stream. Fuel processor 15 is described in further detail below.

Fuel cell 20 electrochemically converts hydrogen and oxygen to water, generating electricity and heat in the process. Ambient air commonly supplies oxygen for fuel cell 20. A pure or direct oxygen source may also be used for oxygen supply. The water often forms as a vapor, depending on the temperature of fuel cell 20 components. The electrochemical reaction also produces carbon dioxide as a byproduct for many fuel cells.

In one embodiment, fuel cell 20 is a low volume polymer electrolyte membrane (PEM) fuel cell suitable for use with portable applications such as consumer electronics. A polymer electrolyte membrane fuel cell comprises a membrane electrode assembly 40 that carries out the electrical energy generating electrochemical reaction. The membrane electrode assembly 40 includes a hydrogen catalyst, an oxygen catalyst and an ion conductive membrane that a) selectively conducts protons and b) electrically isolates the hydrogen catalyst from the oxygen catalyst. A hydrogen gas distribution layer contains the hydrogen catalyst and allows the diffusion of hydrogen therethrough. An oxygen gas distribution layer contains the oxygen catalyst and allows the diffusion of oxygen and hydrogen protons therethrough. The ion conductive membrane separates the hydrogen and oxygen gas distribution layers. In chemical terms, the anode comprises the hydrogen gas distribution layer and hydrogen catalyst, while the cathode comprises the oxygen gas distribution layer and oxygen catalyst.

A PEM fuel cell often includes a fuel cell stack having a set of bi-polar plates. A membrane electrode assembly is disposed between two bi-polar plates. Hydrogen distribution 43 occurs via a channel field on one plate while oxygen distribution 45 occurs via a channel field on a second facing plate. Specifically, a first channel field distributes hydrogen to the hydrogen gas distribution layer, while a second channel field distributes oxygen to the oxygen gas distribution layer. The 'term 'bi-polar' refers electrically to a bi-polar plate (whether comprised of one plate or two plates) sandwiched between two membrane electrode assembly layers. In this case, the bi-polar plate acts as both a negative terminal for one adjacent membrane electrode assembly and a positive terminal for a second adjacent membrane electrode assembly arranged on the opposite face of the bi-polar plate.

In electrical terms, the anode includes the hydrogen gas distribution layer, hydrogen catalyst and bi-polar plate. The anode acts as the negative electrode for fuel cell 20 and conducts electrons that are freed from hydrogen molecules so that they can be used externally, e.g., to power an external circuit. In a fuel cell stack, the bi-polar plates are connected in series to add the potential gained in each layer of the stack. In electrical terms, the cathode includes the oxygen gas distribution layer, oxygen catalyst and bi-polar plate. The cathode represents the positive electrode for fuel cell 20 and conducts the electrons back from the external electrical circuit to the oxygen catalyst, where they can recombine with hydrogen ions and oxygen to form water.

The hydrogen catalyst separates the hydrogen into protons and electrons. The ion conductive membrane blocks the electrons, and electrically isolates the chemical anode (hydrogen gas distribution layer and hydrogen catalyst) from the chemical cathode. The ion conductive membrane also selectively conducts positively charged ions. Electrically, the anode conducts electrons to a load (electricity is produced) or battery (energy is stored). Meanwhile, protons move through the ion conductive membrane, to combine with oxygen. The protons and used electrons subsequently meet on the cathode side, and combine with oxygen to form water. The oxygen catalyst in the oxygen gas distribution layer facilitates this reaction.

One common oxygen catalyst comprises platinum powder very thinly coated onto a carbon paper or cloth. Many designs employ a rough and porous catalyst to increase surface area of the platinum exposed to the hydrogen and oxygen.

In one embodiment, fuel cell 20 comprises a set of bi-polar plates that each includes channel fields on opposite faces that distribute the hydrogen and oxygen. One channel field distributes hydrogen while a channel field on the opposite face distributes oxygen. Multiple bi-polar plates can be stacked to produce a 'fuel cell stack' in which a membrane electrode assembly is disposed between each pair of adjacent bi-polar plates. Since the electrical generation process in fuel cell 20 is exothermic, fuel cell 20 may implement a thermal management system to dissipate heat from the fuel cell. Fuel cell 20 may also employ a number of humidification plates (HP) to manage moisture levels in the fuel cell. Further description of a fuel cell suitable for use with the present invention is included in commonly owned co-pending patent application Ser. No. 10/877,824 entitled "Micro Fuel Cell Architecture" naming Ian Kaye as inventor and filed Jun. 25, 2004. This application is incorporated by reference for all purposes.

While the present invention will mainly be discussed with respect to PEM fuel cells, it is understood that the present invention may be practiced with other fuel cell architectures. The main difference between fuel cell architectures is the type of ion conductive membrane used. In one embodiment, fuel cell 20 is phosphoric acid fuel cell that employs liquid phosphoric acid for ion exchange. Solid oxide fuel cells employ a hard, non-porous ceramic compound for ion exchange and may be suitable for use with the present invention. Generally, any fuel cell architecture may benefit from fuel processor improvements described herein. Other such fuel cell architectures include direct methanol, alkaline and molten carbonate fuel cells.

Fuel cell 20 generates dc voltage that may be used in a wide variety of applications. For example, electricity generated by fuel cell 20 may be used to power a motor or light. In one embodiment, the present invention provides 'small' fuel cells that are designed to output less than 200 watts of power (net or total). Fuel cells of this size are commonly referred to as 'micro fuel cells' and are well suited for use with portable electronics. In one embodiment, fuel cell 20 is configured to generate from about 1 milliwatt to about 200 watts. In another embodiment, fuel cell 20 generates from about 3 W to about 20 W. Fuel cell 20 may also be a stand-alone fuel cell, which is a single unit that produces power as long as it has an a) oxygen and b) hydrogen or a hydrocarbon fuel supply. A fuel cell 20 that outputs from about 40 W to about 100 W is well suited to power a laptop computer.

Figure 1B:
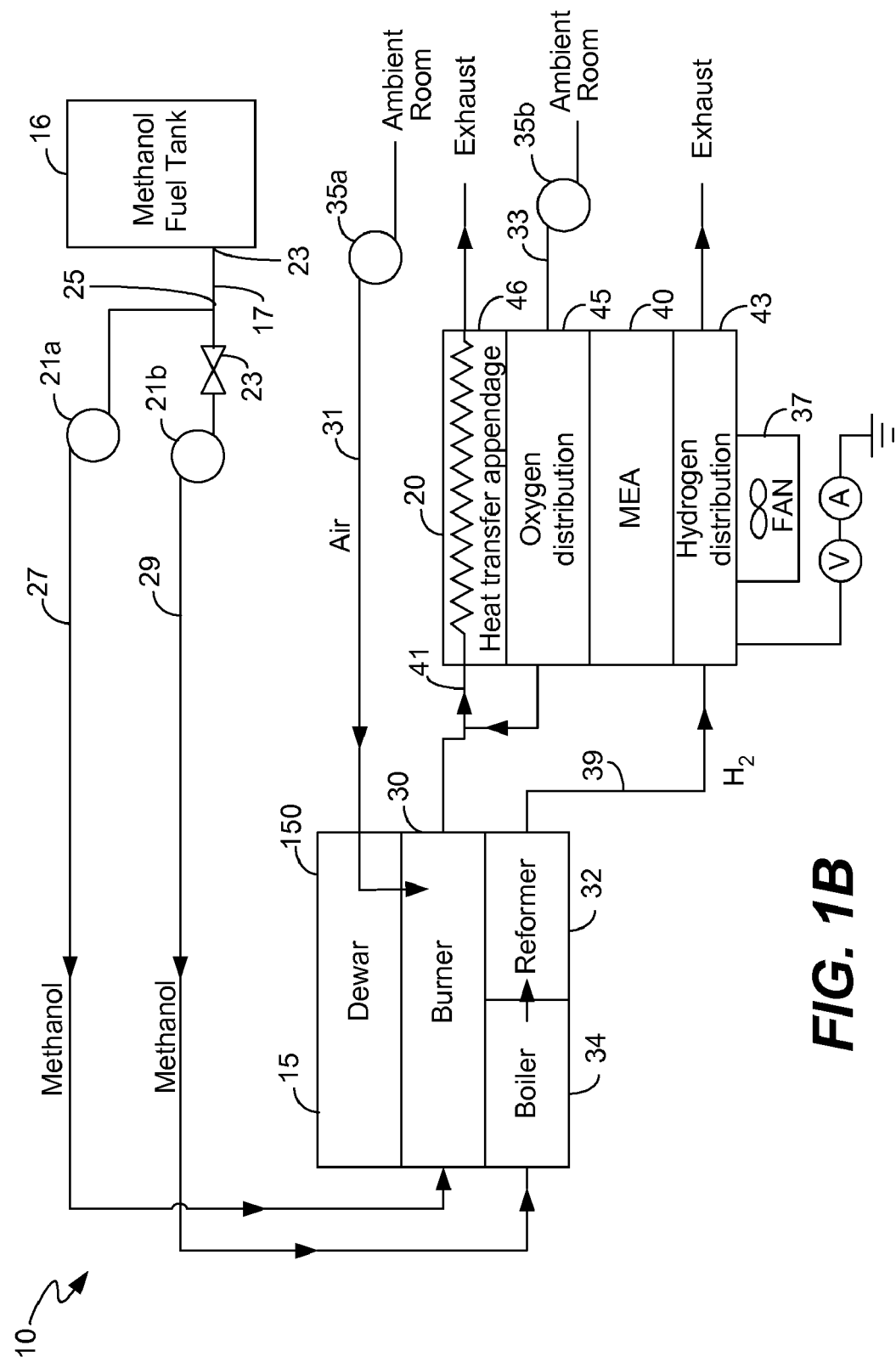
FIG. 1B illustrates schematic operation for the fuel cell system of FIG. 1A in accordance with a specific embodiment of the present invention.

FIG. 1B illustrates schematic operation for fuel cell system 10 in accordance with a specific embodiment of the present invention. As shown, fuel cell system 10 comprises fuel container 16, hydrogen fuel source 17, fuel processor 15, fuel cell 20, multiple pumps 21 and fans 35, fuel lines and gas lines, and one or more valves 23. While the present invention will now primarily be described with respect to methanol as fuel source 17, it is understood that the present invention may employ another fuel source 17 such as one provided above.

Fuel container 16 stores methanol as a hydrogen fuel source 17. An outlet 26 of fuel container 16 provides methanol 17 into hydrogen fuel source line 25. As shown, line 25 divides into two lines: a first line 27 that transports methanol 17 to a burner 30 for fuel processor 15 and a second line 29 that transports methanol 17 to reformer 32 in fuel processor 15. Lines 25, 27 and 29 may comprise plastic tubing, for example. Separate pumps 21a and 21b are provided for lines 27 and 29, respectively, to pressurize the lines and transmit the fuel source at independent rates if desired. A model P625 pump as provided by Instech of Plymouth Meeting, Pa. is suitable to transmit liquid methanol for system 10 is suitable in this embodiment. A flow sensor or valve 23 situated on line 29 between storage device 16 and fuel processor 18 detects and communicates the amount of methanol 17 transfer between storage device 16 and reformer 32. In conjunction with the sensor or valve 23 and suitable control, such as digital control applied by a processor that implements instructions from stored software, pump 21*b* regulates methanol 17 provision from storage device 16 to reformer 32.

Fan 35*a* delivers oxygen and air from the ambient room through line 31 to regenerator 36 of fuel processor 15. Fan 35*b* delivers oxygen and air from the ambient room through line 33 to regenerator 36 of fuel processor 15. In this embodiment, a model AD2005DX-K70 fan as provided by Adda USA of California is suitable to transmit oxygen and air for fuel cell system 10. A fan 37 blows cooling air over fuel cell 20 and its heat transfer appendages 46.

Fuel processor 15 receives methanol 17 from storage device 16 and outputs hydrogen. Fuel processor 15 comprises burner 30, reformer 32, boiler 34 and dewar 150. Burner 30 includes an inlet that receives methanol 17 from line 27 and a catalyst that generates heat with methanol presence. In one embodiment, burner 30 includes an outlet that exhausts heated gases to a line 41, which transmits the heated gases over heat transfer appendages 46 of fuel cell 20 to pre-heat the fuel cell and expedite warm-up time needed when initially turning on fuel cell 20. An outlet of burner 30 may also exhaust heated gases into the ambient room.

Boiler 34 includes an inlet that receives methanol 17 from line 29. The structure of boiler 34 permits heat produced in burner 30 to heat methanol 17 in boiler 34 before reformer 32 receives the methanol 17. Boiler 34 includes an outlet that provides heated methanol 17 to reformer 32.

Reformer 32 includes an inlet that receives heated methanol 17 from boiler 34. A catalyst in reformer 32 reacts with the methanol 17 and produces hydrogen and carbon dioxide. This reaction is slightly endothermic and draws heat from burner 30. A hydrogen outlet of reformer 32 outputs hydrogen to line 39. In one embodiment, fuel processor 15 also includes a preferential oxidizer that intercepts reformer 32 hydrogen exhaust and decreases the amount of carbon monoxide in the exhaust. The preferential oxidizer employs oxygen from an air inlet to the preferential oxidizer and a catalyst based on, for example ruthenium or platinum, that is preferential to carbon monoxide over carbon dioxide.

Dewar 150 pre-heats a process gas or liquid before the air enters burner 30. Dewar 150 also reduces heat loss from fuel cell 15 by heating the incoming process liquids or gases before the heat escapes fuel processor 15. In one sense, dewar 150 acts as a regenerator that uses waste heat in fuel processor 15 to improve thermal management and thermal efficiency of the fuel processor. Specifically, waste heat from burner 30 may be used to pre-heat incoming air provided to burner 30 to reduce heat transfer to the air in the burner so more heat transfers to reformer 32. Dewar 150 is described in further detail below.

Line 39 transports hydrogen from fuel processor 15 to fuel cell 20. Gaseous delivery lines 31, 33 and 39 may comprise polymeric or metallic tubing, for example. A hydrogen flow sensor (not shown) may also be added on line 39 to detect and communicate the amount of hydrogen being delivered to fuel cell 20. In conjunction with the hydrogen flow sensor and suitable control, such as digital control applied by a processor that implements instructions from stored software, fuel processor 15 regulates hydrogen gas provision to fuel cell 20.

Fuel cell 20 includes an hydrogen inlet port that receives hydrogen from line 39 and delivers it to a hydrogen intake manifold for delivery to one or more bi-polar plates and their hydrogen distribution channels. An oxygen inlet port of fuel cell 20 receives oxygen from line 33 and delivers it to an oxygen intake manifold for delivery to one or more bi-polar plates and their oxygen distribution channels. An anode exhaust manifold collects gases from the hydrogen distribution channels and delivers them to an anode exhaust port, which outlets the exhaust gases into the ambient room. A cathode exhaust manifold collects gases from the oxygen distribution channels and delivers them to a cathode exhaust port.

The schematic operation for fuel cell system 10 shown in FIG. 1B is exemplary and other variations on fuel cell system design, such as reactant and byproduct plumbing, are contemplated. In addition to the components shown in shown in FIG. 1B, system 10 may also include other elements such as electronic controls, additional pumps and valves, added system sensors, manifolds, heat exchangers and electrical interconnects useful for carrying out functionality of system 10 that are known to one of skill in the art and omitted herein for sake of brevity.

Figure 1C:
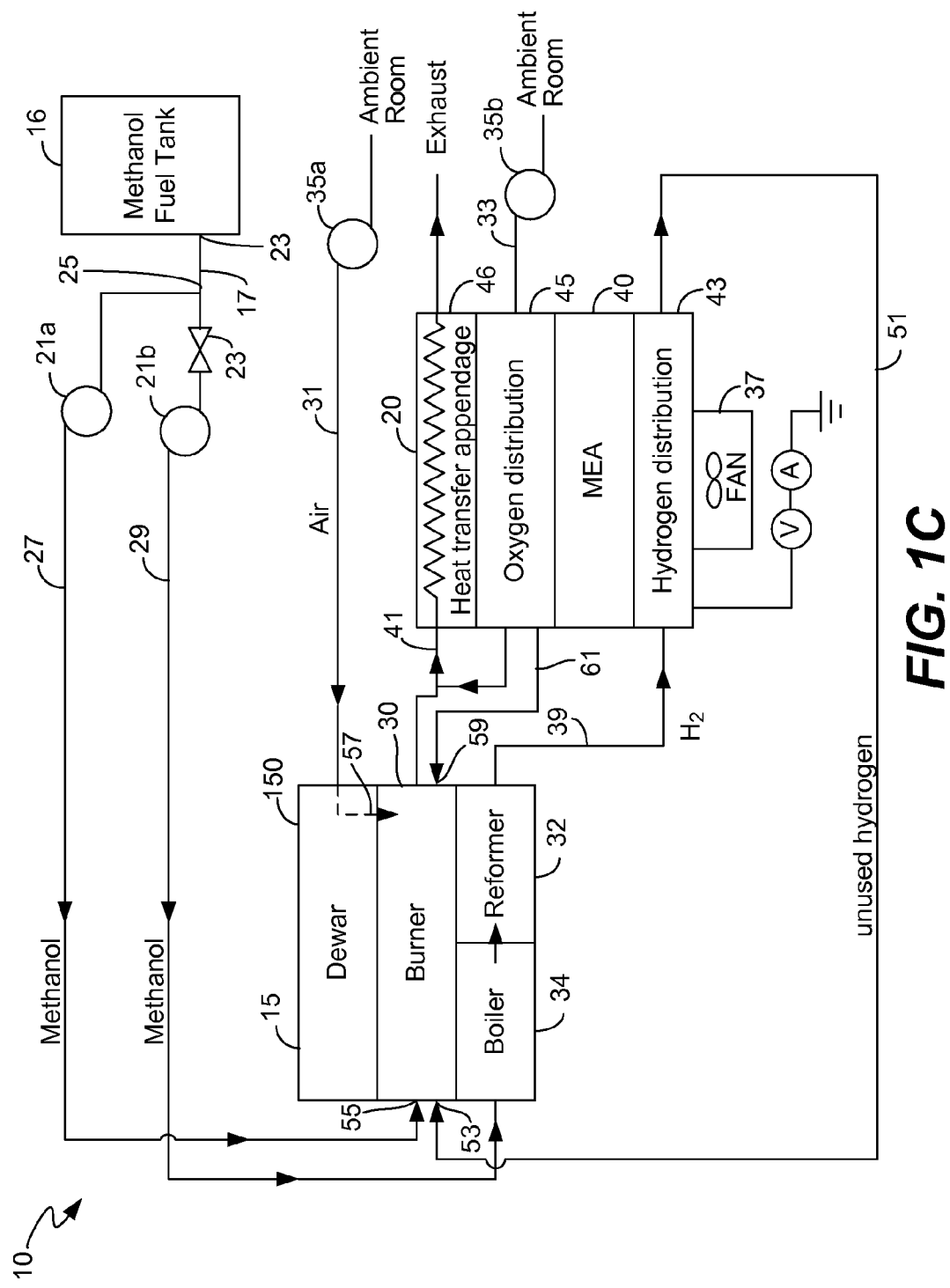
FIG. 1C illustrates an embodiment of the fuel cell system of FIG. 1A that routes hydrogen from an anode exhaust of the fuel cell back to a burner in the fuel processor.

FIG. 1C illustrates an embodiment of fuel system 10 that routes unused hydrogen from fuel cell 20 back to burner 30. Burner 30 includes a catalyst that reacts with the unused hydrogen to produce heat. Since hydrogen consumption within fuel cell 20 is often incomplete and the anode exhaust often includes unused hydrogen, re-routing the anode exhaust to burner 30 allows fuel cell system 10 to capitalize on unused hydrogen in fuel cell 20 and increase hydrogen usage and efficiency in system 10. As the term is used herein, unused hydrogen generally refers to hydrogen output from a fuel cell.

Line 51 is configured to transmit unused hydrogen from fuel cell 20 to burner 30 of fuel processor 15. For FIG. 1C, burner 30 includes two inlets: an inlet 55 configured to receive the hydrogen fuel source 17 and an inlet 53 configured to receive the hydrogen from line 51. Anode gas collection channels, which distribute hydrogen from fuel processor 15 to each membrane electrode assembly layer, collect and exhaust the unused hydrogen. An inlet fan pressurizes line 39 that delivers the hydrogen from an outlet of fuel processor 15 to an anode inlet of fuel cell 20. The inlet fan also pressurizes the anode gas collection channels for distribution of hydrogen within fuel cell 20. In one embodiment, gaseous delivery in line 51 back to fuel processor 15 relies on pressure at the exhaust of the anode gas distribution channels, e.g., in the anode exhaust manifold. In another embodiment, an extra fan is added to line 51 to pressurize line 51 and return unused hydrogen back to fuel processor 15.

Burner 30 also includes an inlet 59 configured to receive oxygen from an oxygen exhaust included in fuel cell 20. Cathode gas collection channels, which distribute oxygen and air from the ambient room to each membrane electrode assembly layer, collect and exhaust the unused oxygen. Line 61 delivers unused oxygen from an exhaust manifold, which collects oxygen from each cathode gas collection channel, to inlet 59. Burner 30 thus includes two oxygen inlets: inlet 59 and an inlet 57 configured to receive oxygen from the ambient room after delivery though dewar 150. Since oxygen consumption within fuel cell 20 is often incomplete and the cathode exhaust includes unused oxygen, re-routing the cathode exhaust to burner 30 allows fuel cell system 10 to capitalize on unused oxygen in fuel cell 20 and increase oxygen usage and efficiency in system 10.

In one embodiment, fuel processor 15 is a steam reformer that only needs steam to produce hydrogen. Several types of reformers suitable for use in fuel cell system 10 include steam reformers, auto thermal reformers (ATR) or catalytic partial oxidizers (CPOX). ATR and CPOX reformers mix air with the fuel and steam mix. ATR and CPOX systems reform fuels such as methanol, diesel, regular unleaded gasoline and other hydrocarbons. In a specific embodiment, storage device 16 provides methanol 17 to fuel processor 15, which reforms the methanol at about 250° C. or less and allows fuel cell system 10 use in applications where temperature is to be minimized.

FIG. 2A illustrates a cross-sectional side view of fuel processor 15 in accordance with one embodiment of the present invention. FIG. 2B illustrates a cross-sectional front view of fuel processor 15 taken through a mid-plane of processor 15 that also shows features of end plate 82. Fuel processor 15 reforms methanol to produce hydrogen. Fuel processor 15 comprises monolithic structure 100, end plates 82 and 84, reformer 32, burner 30, boiler 34, boiler 108, dewar 150 and housing 152. Although the present invention will now be described with respect to methanol consumption for hydrogen production, it is understood that fuel processors of the present invention may consume another fuel source, as one of skill in the art will appreciate.

As the term is used herein, 'monolithic' refers to a single and integrated structure that includes at least portions of multiple components used in fuel processor 15. As shown, monolithic structure 100 includes reformer 32, burner 30, boiler 34 and boiler 108. Monolithic structure 100 may also include associated plumbing inlets and outlets for reformer 32, burner 30 and boiler 34. Monolithic structure 100 comprises a common material 141 that constitutes the structure. Common material 141 is included in walls that define the reformer 32, burner 32 and boilers 34 and 108. Specifically, walls 111, 119, 120, 122, 130, 132, 134 and 136 all comprise common material 141. Common material 141 may comprise a metal, such as copper, silicon, stainless steel, inconel and other metal/alloys displaying favorable thermal conducting properties. The monolithic structure 100 and common material 141 simplify manufacture of fuel processor 15. For example, using a metal for common material 141 allows monolithic structure 100 to be formed by extrusion or casting. In some cases, monolithic structure 100 is consistent in cross sectional dimensions between end plates 82 and 84 and solely comprises copper formed in a single extrusion. Common material 141 may also include a ceramic, for example. A ceramic monolithic structure 100 may be formed by sintering.

Housing 152 provides mechanical protection for internal components of fuel processor 15 such as burner 30 and reformer 32. Housing 152 also provides separation from the environment external to processor 15 and includes inlet and outlet ports for gaseous and liquid communication in and out of fuel processor 15. Housing 152 includes a set of housing walls 161 that at least partially contain a dewar 150 and provide external mechanical protection for components in fuel processor 15. Walls 161 may comprises a suitably stiff material such as a metal or a rigid polymer, for example. Dewar 150 improves thermal heat management for fuel processor 15 and will be discussed in further detail with respect to FIG. 4A.

Together, monolithic structure 100 and end plates 82 and 84 structurally define reformer 32, burner 30, boiler 34 and boiler 108 and their respective chambers. Monolithic structure 100 and end plates 82 and 84 are shown separate in FIG. 2A for illustrative purposes, while FIG. 4A shows them together.

Referring to FIG. 2B, boiler 34 heats methanol before reformer 32 receives the methanol. Boiler 34 receives the methanol via fuel source inlet 81, which couples to the methanol supply line 27 of FIG. 1B. Since methanol reforming and hydrogen production via a catalyst 102 in reformer 32 often requires elevated methanol temperatures, fuel processor 15 pre-heats the methanol before receipt by reformer 32 via boiler 34. Boiler 34 is disposed in proximity to burner 30 to receive heat generated in burner 30. The heat transfers via conduction through monolithic structure from burner 30 to boiler 34 and via convection from boiler 34 walls to the methanol passing therethrough. In one embodiment, boiler 34 is configured to vaporize liquid methanol. Boiler 34 then passes the gaseous methanol to reformer 32 for gaseous interaction with catalyst 102.

Reformer 32 is configured to receive methanol from boiler 34. Walls 111 in monolithic structure 100 (see cross section in FIG. 3A) and end walls 113 (FIG. 2B) on end plates 82 and 84 define dimensions for a reformer chamber 103. In one embodiment, end plate 82 and/or end plate 84 includes also channels 95 (FIG. 2A) that route heated methanol exhausted from boiler 34 into reformer 32. The heated methanol then enters the reformer chamber 103 at one end of monolithic structure 100 and passes to the other end where the reformer exhaust is disposed. In another embodiment, a hole disposed in a reformer 32 wall receives inlet heated methanol from a line or other supply. The inlet hole or port may be disposed on a suitable wall 111 or 113 of reformer 32.

Reformer 32 includes a catalyst 102 that facilitates the production of hydrogen. Catalyst 102 reacts with methanol 17 and facilitates the production of hydrogen gas and carbon dioxide. In one embodiment, catalyst 102 comprises pellets packed to form a porous bed or otherwise suitably filled into the volume of reformer chamber 103. In one embodiment, pellet sizes are designed to maximize the amount of surface area exposure to the incoming methanol. Pellet diameters ranging from about 50 microns to about 1.5 millimeters are suitable for many applications. Pellet diameters ranging from about 350 microns to about 1500 microns are suitable for use with reformer chamber 103. Pellet sizes and packing may also be varied to control the pressure drop that occurs through reformer chamber 103. In one embodiment, pressure drops from about 0.2 to about 5 psi gauge are suitable between the inlet and outlet of reformer chamber 103. Pellet sizes may be varied relative to the cross sectional size of reformer chamber 103, e.g., as reformer chamber 103 increases in size so may catalyst 102 pellet diameters. In one embodiment, the ratio of pellet diameter (d) to cross sectional height 117 (D) may range from about 0.0125 to about 1. A D/d ratio from about 5 to about 20 is also suitable for many applications. A packing density may also characterize packing of catalyst 102 in reformer chamber 103. For a copper zinc catalyst 102, packing densities from about 0.3 grams/milliliter to about 2 grams/milliliter are suitable. Packing densities from about 0.9 grams/milliliter to about 1.4 grams/milliliter are appropriate for the embodiment shown in FIG. 3A.

One suitable catalyst 102 may include CuZn on alumina pellets when methanol is used as a hydrocarbon fuel source 17. Other materials suitable for catalyst 102 may be based on nickel, platinum, palladium, or other precious metal catalysts either alone or in combination, for example. Catalyst 102 pellets are commercially available from a number of vendors known to those of skill in the art. Pellet catalysts may also be disposed within a baffling system disposed in the reformer chamber 103. The baffling system includes a set of walls that guide the fuel source along a non-linear path. The baffling slows and controls flow of gaseous methanol in chamber 103 to improve interaction between the gaseous methanol and pellet catalyst 102. Catalyst 102 may alternatively comprise catalyst materials listed above coated onto a metal sponge or metal foam. A wash coat of the desired metal catalyst material onto the walls of reformer chamber 103 may also be used for reformer 32.

Reformer 32 is configured to output hydrogen and includes an outlet port 87 that communicates hydrogen formed in reformer 32 outside of fuel processor 15. In fuel cell system 10, port 87 communicates hydrogen to line 39 for provision to hydrogen distribution 43 in fuel cell 20. Port 87 is disposed on a wall of end plate 82 and includes a hole that passes through the wall (see FIG. 2B). The outlet hole port may be disposed on any suitable wall 111 or 113.

Hydrogen production in reformer 32 is slightly endothermic and draws heat from burner 30. Burner 30 generates heat and is configured to provide heat to reformer 32. Burner 30 is disposed annularly about reformer 32, as will be discussed in further detail below. As shown in FIG. 2B, burner 30 comprises two burners (or burner sections) 30a and 30b and their respective burner chambers 105a and 105b that surround reformer 32. Burner 30 includes an inlet that receives methanol 17 from boiler 108 via a channel in one of end plates 82 or 84. In one embodiment, the burner inlet opens into burner chamber 105a. The methanol then travels the length 142 of burner chamber 105a to channels disposed in end plate 82 that route methanol from burner chamber 105a to burner chamber 105b. The methanol then travels the back through the length 142 of burner chamber 105b to burner exhaust 89. In another embodiment, the burner inlet opens into both chambers 105a and 105b. The methanol then travels the length 142 of both chambers 105a and 105b to burner exhaust 89.

In one embodiment, burner 30 employs catalytic combustion to produce heat. A catalyst 104 disposed in each burner chamber 105 helps a burner fuel passed through the chamber generate heat. In one embodiment, methanol produces heat in burner 30 and catalyst 104 facilitates the methanol production of heat. In another embodiment, waste hydrogen from fuel cell 20 produces heat in the presence of catalyst 104. Suitable burner catalysts 104 may include platinum or palladium coated onto a suitable support or alumina pellets for example. Other materials suitable for catalyst 104 include iron, tin oxide, other noble-metal catalysts, reducible oxides, and mixtures thereof. The catalyst 104 is commercially available from a number of vendors known to those of skill in the art as small pellets. The pellets that may be packed into burner chamber 105 to form a porous bed or otherwise suitably filled into the burner chamber volume. Catalyst 104 pellet sizes may be varied relative to the cross sectional size of burner chamber 105. Catalyst 104 may also comprise catalyst materials listed above coated onto a metal sponge or metal foam or wash coated onto the walls of burner chamber 105. A burner outlet port 89 (FIG. 2A) communicates exhaust formed in burner 30 outside of fuel processor 15.

Some fuel sources generate additional heat in burner 30, or generate heat more efficiently, with elevated temperatures. Fuel processor 15 includes a boiler 108 that heats methanol before burner 30 receives the fuel source. In this case, boiler 108 receives the methanol via fuel source inlet 85. Boiler 108 is disposed in proximity to burner 30 to receive heat generated in burner 30. The heat transfers via conduction through monolithic structure from burner 30 to boiler 108 and via convection from boiler 108 walls to the methanol passing therethrough.

Air including oxygen enters fuel processor 15 via air inlet port 91. Burner 30 uses the oxygen for catalytic combustion of methanol. As will be discussed in further detail below with respect to FIGS. 4A and 4B, air first passes along the outside of dewar 150 before passing through apertures in the dewar and along the inside of dewar 150. This heats the air before receipt by air inlet port 93 of burner 30.

Figure 3A:
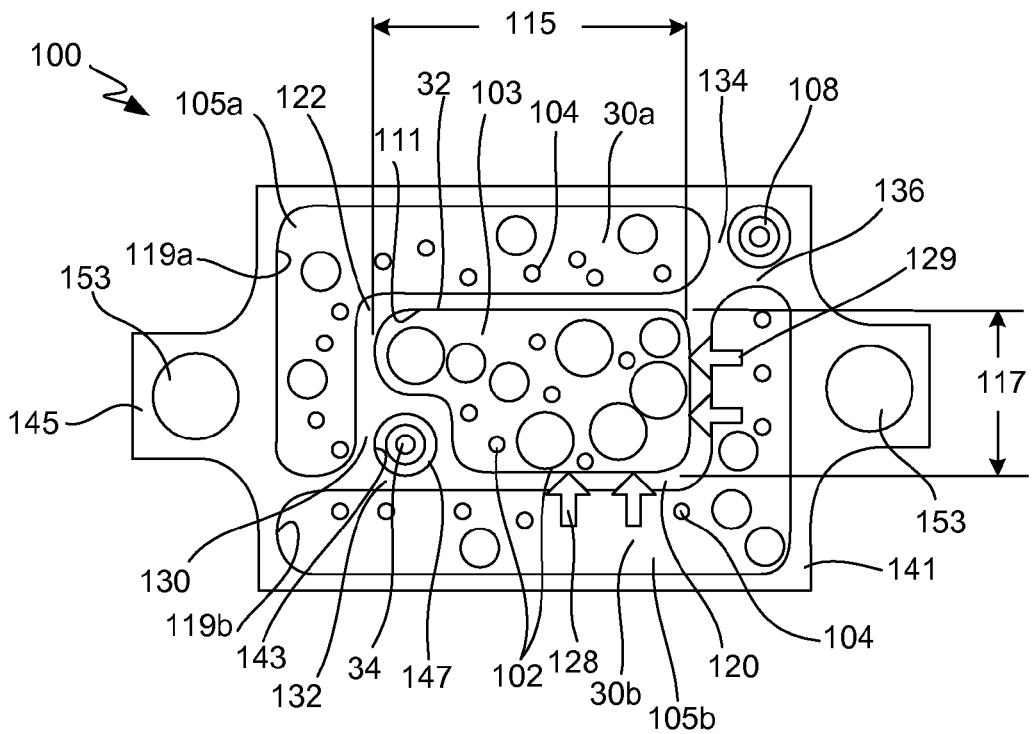
FIG. 3A illustrates a cross-sectional front view of a monolithic structure employed in the fuel processor of FIG. 2A in accordance with one embodiment of the present invention.

FIG. 3A illustrates a cross-sectional front view of monolithic structure 100 as taken through a mid-plane 121 in accordance with one embodiment of the present invention. Monolithic structure 100 extends from end plate 82 to end plate 84. The cross section of monolithic structure 100 shown in FIG. 3A extends from one end of structure 100 at end plate 82 to the other end of structure 100 at end plate 84. Monolithic structure 100 includes reformer 32, burner 30, boiler 34 and boiler 108 between end plates 82 and 84.

Reformer 32 includes a reformer chamber 103, which is a voluminous space in fuel processor 15 that includes the reforming catalyst 102, opens to the fuel source inlet (from boiler 34 for fuel processor 15), and opens to hydrogen outlet 87. Side walls 111 define a non-planar cross-sectional shape for reformer 32 and its reformer chamber 103. Walls 113 on end plates 82 and 84 close the reformer chamber 103 on either end of the chamber 103 and include the inlet and outlet ports to the chamber 103.

Reformer chamber 103 includes a non-planar volume. As the term is used herein, a non-planar reformer chamber 103 refers to a shape in cross section that is substantially non-flat or non-linear. A cross section refers to a planar slice that cuts through the fuel processor or component. For cross sections that include multiple fuel processor components (e.g., both burner 30 and reformer 32), the cross section includes both components. For the vertical and front cross section 121 shown in FIG. 3A, the cross section dimensions shown are consistent for monolithic structure 100 from end plate 82 to end plate 84, and are consistent at each cross section 121 (FIG. 2A).

Reformer 32 and its reformer chamber 103 may employ a quadrilateral or non-quadrilateral cross-sectional shape. Four sides define a quadrilateral reformer chamber 103 in cross section. Four substantially orthogonal sides define rectangular and square quadrilateral reformers 32. A non-quadrilateral reformer 32 may employ cross-sectional geometries with more or less sides, an elliptical shape (see FIG. 3B), and more complex cross-sectional shapes. As shown in FIG. 3A, reformer 32 includes a six-sided cross-sectional 'P-shape' with chamfered corners. One corner section of reformer 32 is removed from monolithic structure 100 to allow for boiler 34 proximity to burner 30.

Reformer chamber 103 is characterized by a cross-sectional width 115 and a cross-sectional height 117. A maximum linear distance between inner walls 111 of chamber 103 in a direction spanning a cross section of reformer chamber 103 quantifies cross-sectional width 155. A maximum linear distance between inner walls 111 of chamber 103 orthogonal to the width 115 quantifies cross-sectional height 117. As shown, cross-sectional height 117 is greater than one-third the cross-sectional width 115. This height/width relationship increases the volume of reformer chamber 103 for a given fuel processor 15. In one embodiment, cross-sectional height 117 is greater than one-half cross-sectional width 115. In another embodiment, cross-sectional height 117 is greater than the cross-sectional width 115.

Referring back to FIG. 2A, reformer chamber 103 includes a length 142 (orthogonal to the width 115 and height 117) that extends from one end of monolithic structure 100 at end plate 82 to the other end of structure 100 at end plate 84. In one embodiment, reformer chamber 103 has a length 142 to width 115 ratio less than 20:1. In a less elongated design, reformer chamber 103 has a length 142 to width 115 ratio less than 10:1.

Reformer 32 provides a voluminous reformer chamber 103. This three dimensional configuration for reformer chamber 103 contrasts micro fuel processor designs where the reformer chamber is etched as micro channels onto a planar substrate. The non-planar dimensions of reformer chamber 103 permit greater volumes for reformer 32 and permit more catalyst 102 for a given size of fuel processor 15. This increases the amount of methanol that can be processed and increases hydrogen output for a particular fuel processor 15 size. Reformer 32 thus improves fuel processor's 15 suitability and performance in portable applications where fuel processor size is important or limited. In other words, since the size of inlet and outlet plumbing and ports varies little while increasing the reformer chamber 103 volume, this allows fuel processor 15 to increase hydrogen output and increase power density for portable applications while maintaining size and weight of the associated plumbing relatively constant. In one embodiment, reformer chamber 103 comprises a volume greater than about 0.1 cubic centimeters and less than about 50 cubic centimeters. In some embodiments, reformer 32 volumes between about 0.5 cubic centimeters and about 2.5 cubic centimeters are suitable for laptop computer applications.

Fuel processor includes at least one burner 30. Each burner 30 includes a burner chamber 105. For a catalytic burner 30, the burner chamber 105 is a voluminous space in fuel processor 15 that includes catalyst 104. For communication or burner reactants and products to and from the burner chamber 105, the burner chamber 105 may directly or indirectly open to a fuel source inlet (from boiler 108 for fuel processor 15), open to an air inlet 93, and open to a burner exhaust 89.

The number of burners 30 and burner chambers 105 may vary with design. Monolithic structure 100 of FIG. 3A includes a dual burner 30a and 30b design having two burner chambers 105a and 105b, respectively, forming non-continuous chambers that substantially surround reformer 32 in cross section. Burner 30a comprises side walls 119a (FIG. 3A) included in monolithic structure 100 and end walls 113 on end plates 82 and 84 (FIG. 2B) that define burner chamber 105a. Similarly, burner 30b includes side walls 119b (FIG. 3A) included in monolithic structure 100 and end walls 113 on end plates 82 and 84 (FIG. 2B) that define burner chamber 105b. Monolithic structure 100 of FIG. 3C includes a single burner 30c with a single burner chamber 105c that fully surrounds reformer 32. Tubular arrangement of FIG. 3B includes over forty burners 204 that fully surround reformer 202. Monolithic structure 452 of FIG. 4F includes a single burner divided into 104 burner chambers that fully surround reformer 32.

Referring to FIG. 2B, each burner 30 is configured relative to reformer 32 such that heat generated in a burner 30 transfers to reformer 32. In one embodiment, the one or more burners 30 are annularly disposed about reformer 32. As the term is used herein, annular configuration of at least one burner 30 relative to reformer 32 refers to the burner 30 having, made up of, or formed by, continuous or non-continuous segments or chambers 105 that surround reformer 32. The annular relationship is apparent in cross section. For burner and reformer arrangements, surrounding refers to a burner 30 bordering or neighboring the perimeter of reformer 32 such that heat may travel from a burner 30 to the reformer 32. Burners 30a and 30b may surround reformer 32 about the perimeter of reformer 32 to varying degrees based on design. At the least, one or more burners 30 surround greater than 50 percent of the reformer 32 cross-sectional perimeter. This differentiates fuel processor 15 from planar and plate designs where the burner and reformer are co-planar and of similar dimensions, and by geometric logic, the burner neighbors less than 50 percent of the reformer perimeter. In one embodiment, one or more burners 30 surround greater than 75 percent of the reformer 32 cross-sectional perimeter. Increasing the extent to which burner 30 surrounds reformer 32 perimeter in cross section increases the surface area of reformer 32 that can be used to heat the reformer volume via heat generated in the burner. For some fuel processor 15 designs, one or more burners 30 may surround greater than 90 percent of the reformer 32 cross-sectional perimeter. For the embodiment shown in FIG. 3B, burner 30 surrounds the entire reformer 32 cross-sectional perimeter.

Although the present invention will now be described with respect to burner 30 annularly disposed about reformer 32, it is understood that monolithic structure 100 may comprise the reverse configuration. That is, reformer 32 may be annularly disposed about burner 30. In this case, reformer 32 may comprise one or more continuous or non-continuous segments or chambers 103 that surround burner 30.

In one embodiment, each burner 30 and its burner chamber 105 has a non-planar cross-sectional shape. A non-planar burner 30 may employ cross-sectional shapes such as quadrilaterals, non-quadrilateral geometries with more or less sides, an elliptical shape (see FIG. 3B for circular/tubular burners 30), or more complex cross-sectional shapes. As shown in FIG. 3A, each burner 30 includes a six-sided cross-sectional 'L' shape (with chamfered corners) that bends 90 degrees about reformer 32.

Each burner 30 thus bilaterally borders reformer 32. N-lateral bordering in this sense refers to the number of sides, N, of reformer 32 that a burner 30 (and its burner chamber 105) borders in cross section. Thus, burner 30b borders the right and bottom sides of reformer 32, while burner 30a borders the top and left sides of reformer 32. A 'U-shaped' burner 30 may be employed to trilaterally border reformer 32 on three sides. Together, burners 30a and 30b quadrilaterally border reformer 32 on all four orthogonal reformer 32 sides. The reformer 32 used in the configuration of FIG. 3B includes multiple tubular burners that quadrilaterally border reformer 32. FIG. 3C illustrates a cross-sectional front view of monolithic structure 100 that comprises a single burner 30c having an 'O-shape' that completely surrounds reformer chamber 103 in accordance with one embodiment of the present invention. Burner 30c is a continuous chamber about the perimeter of reformer 32 and quadrilaterally borders reformer 32.

Heat generated in burner 30 transfers directly and/or indirectly to reformer 32. For the monolithic structure 100 of FIG. 3A, each burner 30 and reformer 32 share common walls 120 and 122 and heat generated in each burner 30 transfers directly to reformer 32 via conductive heat transfer through common walls 120 and 122. Wall 120 forms a boundary wall for burner 30b and a boundary wall for reformer 32. As shown, one side of wall 120 opens to burner chamber 105b while another portion of the wall opens to reformer chamber 103. Wall 120 thus permits direct conductive heat transfer between burner 30b and reformer 32. Similarly, wall 122 forms a boundary wall for burner 30a and a boundary wall for reformer 32, opens to burner chamber 105a, opens to reformer chamber 103, and permits direct conductive heat transfer between burner 30a and reformer 32. Walls 120 and 122 are both non-planar in cross section and border multiple sides of reformer chamber 103 that are neighbored by burners 30b and 30a. Wall 120 thus provides direct conductive heat transfer in multiple orthogonal directions 128 and 129 from burner 30a to reformer 32. Wall 122 similarly provides direct conductive heat transfer in directions opposite to 128 and 129 from burner 30b to reformer 32.

Boiler 34 comprises cylindrical walls 143 included in monolithic structure 100 and end walls 113 on end plates 82 and 84 (see FIG. 2B) that define boiler chamber 147. Circular walls 143 in cross section form a cylindrical shape for boiler 34 that extends from routing end 82 to routing end 84. Boiler 34 is disposed in proximity to burners 30a and 30b to receive heat generated in each burner 30. For monolithic structure 100, boiler 34 shares a common wall 130 with burner 30a and a common wall 132 with burner 30b. Common walls 130 and 132 permit direct conductive heat transfer from each burner 30 to boiler 34. Boiler 34 is also disposed between burners 30 and reformer 32 to intercept thermal conduction consistently moving from the high temperature and heat generating burners 30 to the endothermic reformer 32.

Boiler 108 is configured to receive heat from burner 30 to heat methanol before burner 30 receives the methanol. Boiler 108 also comprises a tubular shape having a circular cross section that extends through monolithic structure 100 from end plate 82 to end plate 84. Boiler 108 is disposed in proximity to burners 30a and 30b to receive heat generated in each burner 30, which is used to heat the methanol. Boiler 108 shares a common wall 134 with burner 30a and a common wall 136 with burner 30b. Common walls 134 and 136 permit direct conductive heat transfer from burners 30a and 30b to boiler 108.

Figure 3B:
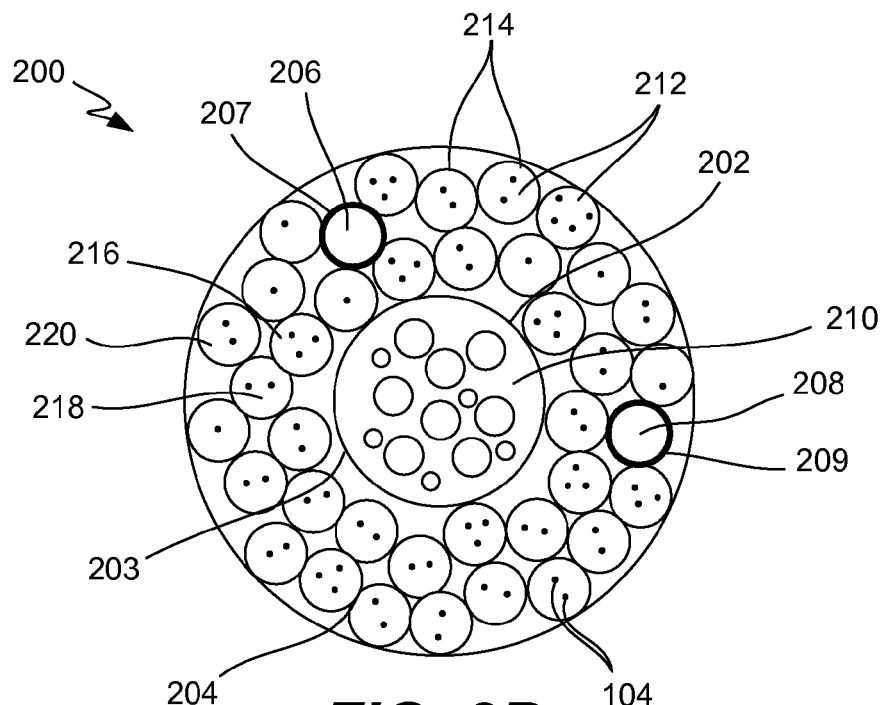
FIG. 3B illustrates a cross-sectional layout of a tubular design for use in a fuel processor in accordance with another embodiment of the present invention.
Figure 3C:
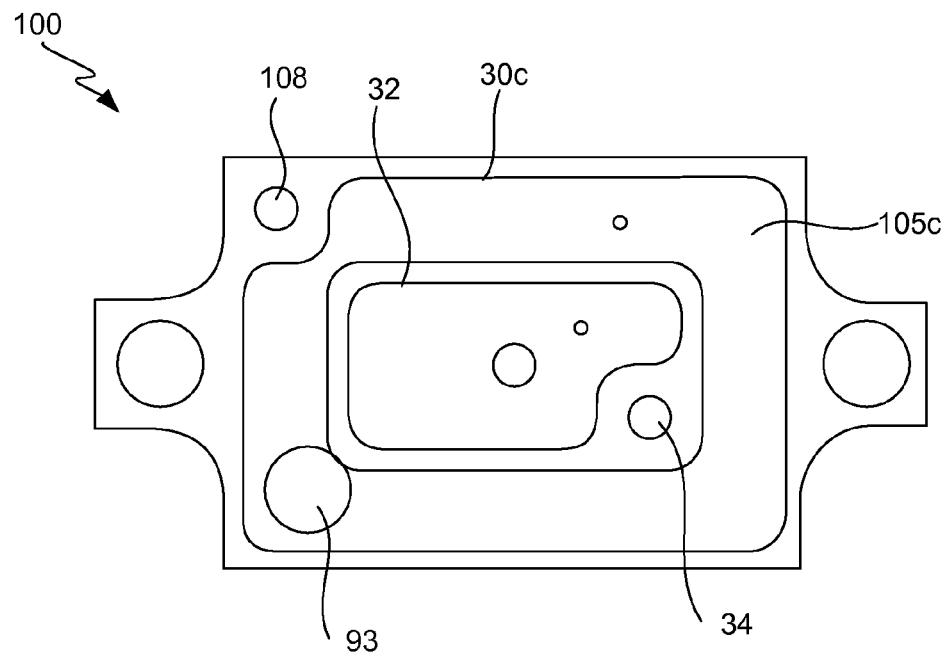
FIG. 3C illustrates a cross-sectional front view of a monolithic structure in a fuel processor that comprises a single burner having an 'O-shape' that completely surrounds a reformer chamber in accordance with one embodiment of the present invention.
Figure 3D:
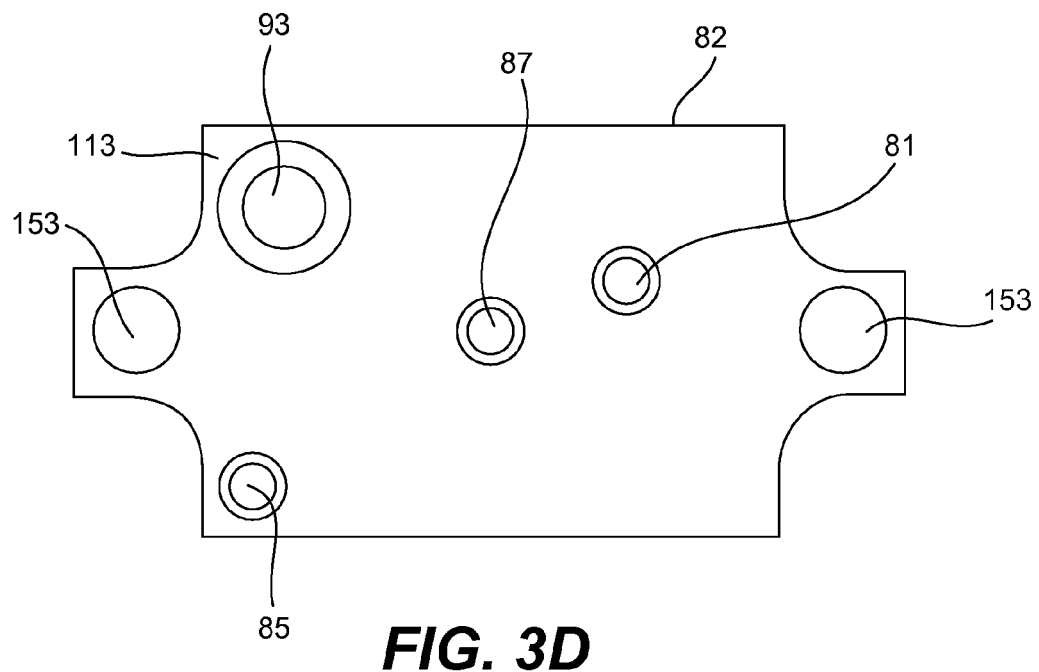
FIG. 3D illustrates an outside view of an end plate used in the fuel processor of FIG. 2A.

FIG. 3D illustrates an outside view of end plate 82 in accordance with one embodiment of the present invention. End plate 82 includes fuel source inlet 81, fuel source fuel source inlet 85, hydrogen outlet port 87 and burner air inlet 93. Fuel source inlet 81 includes a hole or port in end wall 113 of end plate 82 that communicates methanol (usually as a liquid) from an external methanol supply to boiler 34 for heating the methanol before receipt by reformer 32. Methanol fuel source inlet 85 includes a hole or port in end wall 113 of end plate 82 that communicates methanol (usually as a liquid) from an external methanol supply to boiler 108 for heating the methanol before receipt by burner 30. Burner air inlet 93 includes a hole or port in end wall 113 of end plate 82 that communicates air and oxygen from the ambient room after it has been preheated in dewar 150. Hydrogen outlet port 87 communicates gaseous hydrogen from reforming chamber 103 outside fuel processor 15.

Bolt holes 153 are disposed in wings 145 of monolithic structure 100. Bolt holes 153 permit the passage of bolts therethrough and allow securing of structure 100 and end plates 82 and 84.

FIG. 3B illustrates a cross-sectional layout of a tubular design 200 for use in fuel processor 15 in place of monolithic structure 100 in accordance with another embodiment of the present invention. Structure 200 includes a reformer 202, burner 204, boiler 206 and boiler 208.

The cross-sectional design 200 shown in FIG. 3B is consistent throughout a cylindrical length between end plates (not shown) that include inlet and outlet ports for supply and exhaust of gases to components of design 200. The circular shape of reformer 202, burner chambers 212, boiler 206 and boiler 208 thus extends for the entire cylindrical length between the end plates. The end plates may also be responsible for routing gases between individual tubes, such as between tubular burners 234.

Reformer 202 includes cylindrical walls 203 that define a substantially circular cross section. Reformer 232 thus resembles a hollow cylinder in three dimensions that defines a tubular reformer chamber 210. In general, reformer 202 may include any elliptical shape (a circle represents an ellipse of about equal orthogonal dimensions) suitable for containing the catalyst 102, for methanol flow through reformer chamber 210, for hydrogen production in reformer chamber 210, and for hydrogen flow in reformer chamber 210. As shown, reformer chamber 210 is defined by a cross sectional width and a cross sectional height that are substantially equal and thus reformer 202 includes a 1:1 cross sectional aspect ratio.

Burner 204 comprises a set of cylindrical walls 214 that each defines a tubular burner chamber 212. As shown, tubular design 200 includes over forty tubular burner chambers 212 that fully surround the cross sectional perimeter of reformer 32. Each tubular burner chamber 212 includes a substantially circular cross-section defined by the cylindrical wall 214. Each tubular burner chamber 212 includes catalyst 104 that facilitates heat generation from methanol. Burner 204 may comprise from about two to about two hundred cylindrical walls 214 and tubular burner chambers 212. Some designs may include from about ten to about sixty tubular burner chambers 212. In one embodiment, each cylindrical wall 214 comprises a metal and is extruded to its desired dimensions. In a specific embodiment, cylindrical wall 214 comprises nickel. The nickel wall 214 may be formed by electroplating nickel onto a suitable substrate such as zinc or aluminum that may subsequently etched out to leave the nickel tube. Other materials that a nickel wall 214 may be formed onto include zinc, tin, lead, wax or plastics. In addition to nickel, wall 214 may include gold, silver, copper, stainless steel, ceramics and materials that display suitable thermal properties without causing complications with burner catalyst 104.

As shown, burner 204 fully annularly surrounds the cross-sectional perimeter of reformer 202. In this case, burner 204 comprises three ring-like layers 216, 218 and 220 of tubes 214 disposed circularly about reformer 202 and at three different radii. The tubes 214 in each layer 216, 218 and 220 circumscribe reformer 202. Heat generated in each tubular chamber 212 of burner 30 transfers directly or indirectly to reformer 202 via several paths: a) heat conduction through the tubes 214 in layer 216 to the walls of reformer 202; b) heat conduction through the tubes 214 in outer layers 218 and 220 to tubes 214 in layer 216 and to the walls of reformer 202; and/or c) heat radiation between tubes 214 in outer layers 218 and 220 and tubes 214 and then conduction inward to reformer 202.

Boiler 206 is configured to heat methanol before reformer 202 receives the methanol. Boiler 206 receives heat from burner 204 and comprises a cylindrical wall 207 that defines a tubular shape for the boiler. Boiler 206 is disposed in proximity to burner tubes 214 to receive heat generated in each burner chamber 212. Specifically, boiler 206 is disposed in the second ring-like layer 218 and receives heat from adjacent burner chambers 212 in layers 216, 218 and 220. Burner 204 provides heat to boiler 206 via conduction through the walls of each adjacent tube 214 and through wall 207.

Boiler 208 is configured to heat methanol before burner 204 receives the methanol. Boiler 208 receives heat from burner 204 and also comprises a cylindrical wall 209 that defines a tubular shape for the boiler. Similar to boiler 206, boiler 208 is disposed in the second ring-like layer 218 and receives heat from adjacent burner chambers 212 in layers 216, 218 and 220.

In one embodiment, a monolithic fuel processor 15 comprises multiple segments joined together in the direction of gas flow in reformer chamber 103 and joined at sectional lines 121. Each segment has a common profile as shown in FIG. 3A and may comprise metal or ceramic elements that are bonded or brazed perpendicular to the direction of gas flow. Alternatively, fuel processor 15 may comprise a single long monolithic piece that bounds all of reformer 32, burner 30, boiler 34 and boiler 108 except for areas bound by end pieces 82 and 84.

Figure 3E:
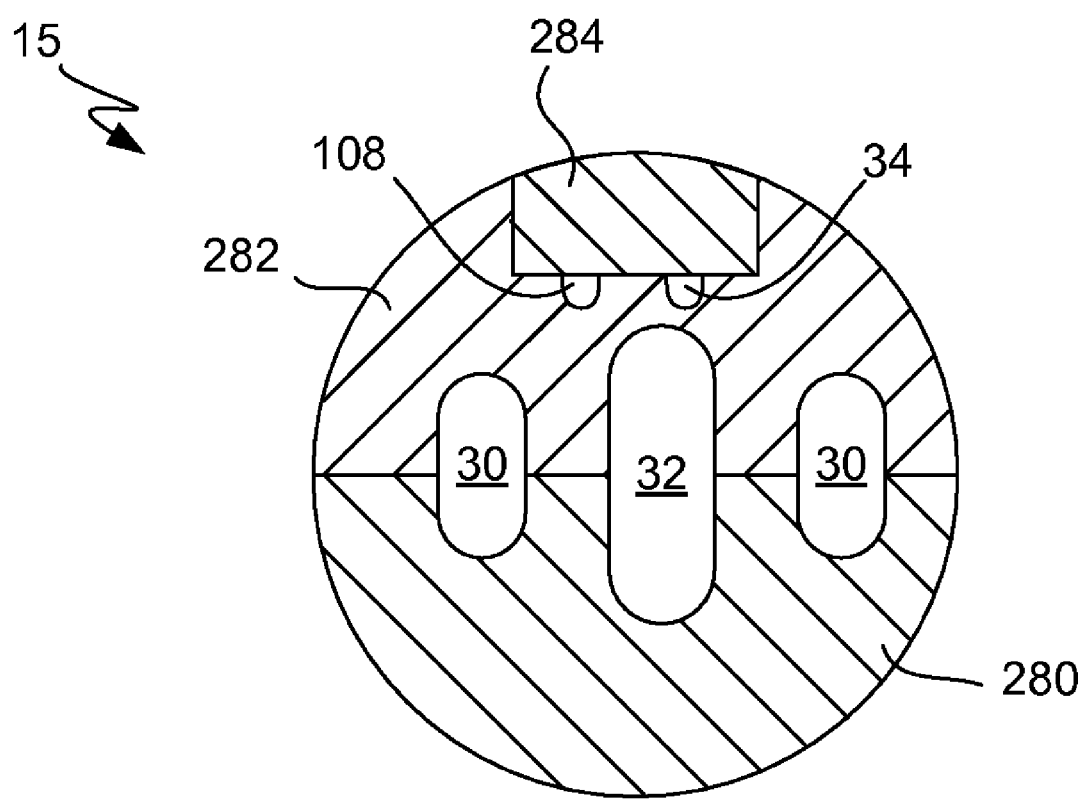
FIG. 3E illustrates a fuel processor 15 in accordance with another embodiment of the present invention.

In another embodiment, fuel processor 15 comprises multiple pieces joined together in cross section. FIG. 3E illustrates a fuel processor 15 in accordance with another embodiment of the present invention. In this case, fuel processor 15 comprises three pieces: lower piece 280, middle piece 282 and cap piece 284. Lower piece 280 and middle piece 282 attach to form reformer 32 and two burner chambers 30. Cap piece 284 and middle piece 282 attach to form boilers 34 and 108. Each piece 208, 282 and 284 comprises a common material and may be extruded or cast to suitable dimensions. Attachment between the pieces may comprise chemical bonding, for example.

FIG. 4A illustrates a side cross-sectional view of fuel processor 15 and movement of air created by dewar 150 in accordance with one embodiment of the present invention. FIG. 4B illustrates a front cross-sectional view of fuel processor 15 and demonstrates thermal management benefits gained by dewar 150. While thermal management techniques described herein will now be described as fuel processor components, those skilled in the art will recognize that the present invention encompasses methods of thermal management for general application.

A burner 30 in fuel processor 15 generates heat and typically operates at an elevated temperature. Burner 30 operating temperatures greater than 200 degrees Celsius are common. Standards for the manufacture of electronics devices typically dictate a maximum surface temperature for a device. Electronics devices such as laptop computers often include cooling, such as a fan or cooling pipe, to manage and dissipate internal heat. A fuel processor internal to an electronics device that loses heat into the device calls upon the device's cooling system to handle the lost heat.

In one embodiment, fuel processor 15 comprises a dewar 150 to improve thermal management for fuel processor 15. Dewar 150 at least partially thermally isolates components internal to housing 152—such as burner 30—and contains heat within fuel processor 15. Dewar 150 reduces heat loss from fuel processor 15 and helps manage the temperature gradient between burner 30 and outer surface of housing 152. And as will be described below, dewar 150 also pre-heats air before it is received by burner 30.

Dewar 150 at least partially contains burner 30 and reformer 32, and includes a set of dewar walls 154 that help form a dewar chamber 156 and a chamber 158. In some embodiments, dewar 150 fully surrounds burner 30 and reformer 32 in a cross sectional view and at both ends of burner 30 and reformer 32. Less containment by dewar 150 is also suitable to provide thermal benefits described herein. The multipass dewar 300 of FIG. 4E only partially encloses burner 30 and reformer 32 in cross section. In some cases, dewar 150 does not extends fully along the length of monolithic structure 100 and provides less than full containment.

As shown in FIG. 4B, dewar 150 annularly surrounds burner 30 in cross section. The set of walls 154 includes side walls 154a and 154c that combine with top and bottom walls 154b and 154d to form the rectangular cross section shown in FIG. 4B; and includes two end walls 154e and 154f that combine with top and bottom walls 154b and 154d to form the rectangular cross section shown in FIG. 4A. End wall 154f includes apertures that permit the passage of inlet and outlet ports 85, 87 and 89 therethough.

Dewar chamber 156 is formed within dewar walls 154 and comprises all space within the dewar walls 154 not occupied by monolithic structure 100. As shown in FIG. 4B, dewar chamber 156 surrounds monolithic structure 100. As shown in FIG. 4B, chamber 156 comprises ducts between monolithic structure 100 and walls 154 on all four sides of dewar 150. In addition, chamber 156 comprises air pockets between end walls of dewar 150 and outside surfaces of end plates 82 and 84 on both ends of monolithic structure 100 (FIG. 4A).

Chamber 158 is formed outside dewar walls 154 between dewar 150 and housing 152. Chamber 158 comprises all space within housing 152 not occupied by dewar 150. As shown in FIG. 4B, housing 152 encloses dewar 150 and the further internal monolithic structure 100. Chamber 158 comprises ducts between walls 154 on all four sides of dewar 150 and housing 152. In addition, chamber 158 comprises air pockets 167 between dewar 150 and housing 152 on both ends that prevent contact and conductive heat transfer between dewar 150 and housing 152 (FIG. 4A).

Dewar 150 is configured such that a process gas or liquid passing through dewar chamber 156 receives heat generated in burner 30. The process gas or liquid may include any reactant used in fuel processor such as oxygen, air, or fuel source 17, for example. Dewar 150 offers thus two functions for fuel processor 15: a) it permits active cooling of components within fuel processor 15 before the heat reaches an outer portion of the fuel processor, and b) it pre-heats the air going to burner 30. For the former, air moves through fuel processor 15 and across walls 154 of dewar 150 such that the cooler air absorbs heat from the warmer fuel processor 15 components.

As shown in FIG. 4A, housing 152 includes an air inlet port 91 or hole that permits the passage of air from outside housing 152 into air into chamber 158. A fan usually provides the air directly to fuel processor 15 and pressurizes the air coming through port 91. Top and bottom walls 154b and 154d include air inlet ports or holes 172 that allow air to pass from chamber 158 to dewar chamber 156. Air flow through fuel processor 15 then flows: in air inlet port 91, through chamber 158 along the length of the dewar 150, through holes 172 in walls 154b and 154d, through chamber 156 back along the length of the dewar 150 in the opposite direction as in through chamber 158, and into air inlet ports 176 that allow the air to enter burner 30. In chamber 158, the air a) moves across the outside surface of dewar walls 154 and absorbs heat convectively from dewar walls 154, and b) moves across the inside surface of housing 152 and absorbs heat convectively from the housing 152 walls (when housing 152 is at a greater temperature than the air). In chamber 156, the air a) moves across the outside surface of monolithic structure 100 and absorbs heat convectively from the walls of monolithic structure 100, and b) moves across the inside surface of dewar 150 and absorbs heat convectively from dewar walls 154.

Dewar 150 is thus configured such that air passing through the dewar receives heat generated in burner 30 via direct convective heat transfer from walls in monolithic structure 100 on the outside of burner 30 to air passing through dewar chamber 156. Dewar 150 is also configured to such that air passing through chamber 156 receives heat indirectly from burner 30. Indirectly in this sense refers to heat generated in burner 30 moving to another structure in fuel processor 15 before receipt by the air.

Figure 4C:
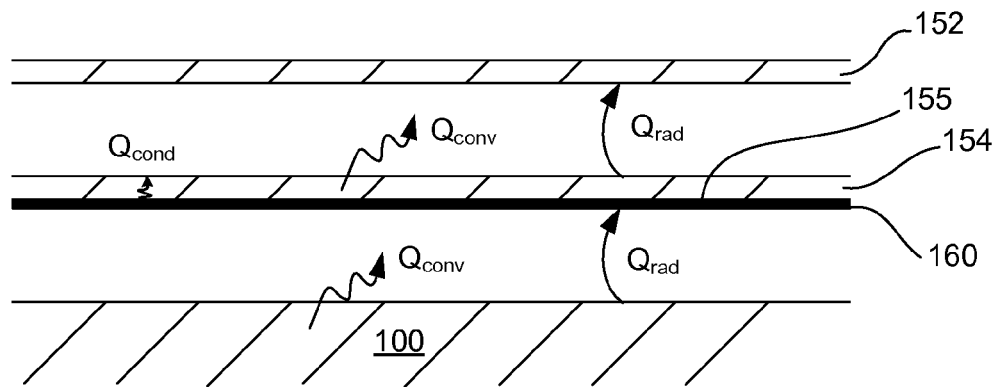
FIG. 4C shows a thermal diagram of the heat path produced by a dewar wall used in the fuel processor of FIG. 2A.

FIG. 4C illustrates a thermal diagram of the heat path produced by a wall 154 of dewar 150. Heat from burner 30 conducts through monolithic structure 100 to a surface of structure 100 that opens into dewar chamber 156. From here, the heat a) conducts into the air passing through dewar chamber 156, thereby heating the air; b) radiates to the inner wall 155 of dewar wall 154, from which the heat convects into the air passing through dewar chamber 156; c) radiates to the inner wall 155 of dewar wall 154, conducts through wall 154 to the outer surface 157 of dewar wall 154, from which the heat convects into the air passing through dewar chamber 158, and d) radiates to the inner wall 155 of dewar wall 154, conducts through wall 154 to the outer surface 157 of dewar wall 154, radiates to a wall of housing 152, from which the heat convects into the air passing through dewar chamber 158.

Dewar 150 thus provides two streams of convective heat dissipation and active air-cooling in volumes 156 and 158 that prevent heat generated in burner 30 (or other internal parts of fuel processor 15) from escaping the fuel processor.

Reflectance of heat back into chamber 156 decreases the amount of heat lost from fuel processor 150 and increases the heating of air passing through chamber 156. To further improve the radiative reflectance back into chamber 156, an inside surface of dewar wall 154 may include a radiative layer 160 to decrease radiative heat transfer into wall 154 (see FIG. 4B or 4C). Radiative layer 160 is disposed on an inner surface 155 on one or more of walls 154 to increase radiative heat reflectance of the inner surface 155. Generally, the material used in radiative layer 160 has a lower emissivity than the material used in walls 154. Materials suitable for use with walls 154 of dewar 150 include nickel or a ceramic, for example. Radiative layer 160 may comprise gold, platinum, silver, palladium, nickel and the metal may be sputter coated onto the inner surface 155. Radiative layer 160 may also include a low heat conductance. In this case, radiative layer 160 may comprise a ceramic, for example.

When dewar 150 fully encapsulates monolithic structure 100, the dewar then bounds heat loss from the structure and decreases the amount of heat passing out of dewar 150 and housing 152. Fuel processors 15 such as that shown in FIGS. 4A and 4B are well suited to contain heat within housing 152 and manage heat transfer from the fuel processor. In one embodiment, burner operates at a temperature greater than about 200 degrees Celsius and the outer side of the housing remains less than about 50 degrees Celsius. In embodiments for portable applications where fuel processor 15 occupies a small volume, volumes 156 and 158 are relatively small and comprise narrow channels and ducts. In some cases, the height of channels in volumes 156 and 158 is less than 5 millimeters and a wall of burner 30 on monolithic structure is no greater than 10 millimeters from a wall of housing 152.

The thermal benefits gained by use of dewar 150 also permit the use of higher temperature burning fuels as a fuel source for hydrogen production, such as ethanol and gasoline. In one embodiment, the thermal management benefits gained by use of dewar 150 permit reformer 32 to process methanol at temperatures well above 100 degrees Celsius and at temperatures high enough that carbon monoxide production in reformer 32 drops to an amount such that a preferential oxidizer is not needed.

As mentioned above, dewar 150 offers a second function for fuel processor 15 by pre-heating the air going to a burner. Burner 30 relies on catalytic combustion to produce heat. Oxygen in the air provided to burner 30 is consumed as part of the combustion process. Heat generated in the burner 30 will heat cool incoming air, depending on the temperature of the air. This heat loss to incoming cool air reduces the heating efficiency of burner 30, and typically results in a greater consumption of methanol. To increase the heating efficiency of burner 30, the present invention heats the incoming air so less heat generated in the burner passes into the incoming air. In other words, chambers and air flow formed by dewar 150 allow waste heat from the burner to pre-heat air before reaching the burner, thus acting as a regenerator for fuel cell 15.

Figure 4D:
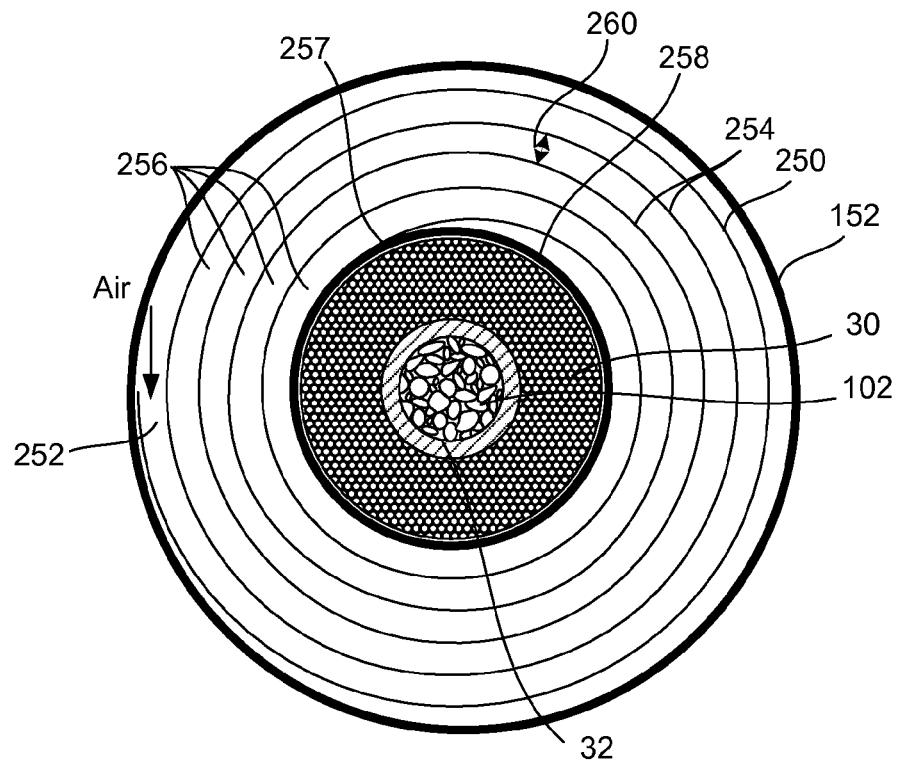
FIG. 4D illustrates a cross sectional view of a fuel processor that increases the convective path that air flows over a dewar wall in accordance with another embodiment of the present invention.

While fuel processor 15 of FIGS. 4A and 4B shows dewar 150 encapsulating monolithic structure 100, the present invention may also employ other architectures for dewar 150 and relationships between burner 30 or reformer 32 and dewar 150 that carry out one or both of the dewar functions described above. FIG. 4D illustrates a cross sectional view of a fuel processor 15 that elongates the convective path for cool air flow over a warmer dewar wall 254 in accordance with another embodiment of the present invention. Fuel processor 15 includes a tubular design for the burner 30 and reformer 32.

Dewar 250 routes cool incoming air across an elongated heat transfer path. Dewar 250 includes a spiral wall 254 in cross section that surrounds burner 30 and reformer 32. Spiral wall 254 defines a spiral dewar chamber 256. Cool air enters dewar chamber 256 at a dewar entrance 252. The innermost portion 257 of wall 254 attaches to an outer wall 258 of burner 30. Heat from burner 30 conducts linearly through spiral wall 254. Thus, inner portion 257 is the warmest portion of wall 254, while wall 254 at entrance 252 is typically the coolest. Air progressively warms as it travels through dewar chamber 256. As the air travels inward, temperature of wall 254 rises, as does the amount of heat available for transfer to the air. Depending on the transient temperature of the air, the amount of heat lost from wall 254 may also increase as the air progresses inward.

Spiral dewar 250 elongates convection interaction between the incoming cool air and a wall warmed by the burner. Dewar 250 also increases the number of walls and convective layers in a given radial direction from the fuel processor center. As shown in FIG. 4D, dewar 250 comprises 4-5 walls and convective layers in a given radial direction, depending on where the number is counted. The number of walls and convective in a radial direction may vary with design. In one embodiment, spiral dewar 250 is configured with from 1 layer to about 50 walls and convective layers in a given radial direction from the fuel processor center. Three layers to 20 layers are suitable for many applications. A channel width 260 defines the duct space between adjacent walls 254. In one embodiment, channel width 260 ranges from about ¼ millimeters to about 5 millimeters.

Spiral dewar 250 may be constructed by electroplating nickel onto a removable layer such as aluminum or zinc. FIG. 4H illustrates spiral dewar 250 in an unrolled form during initial construction in accordance with another embodiment of the present invention. Initial aluminum or zinc layer 262 is added to control channel width 260 during rolling. The removable layer 262 is subsequently electroplated with the wall 214 choice of material, for example nickel. After which the aluminum or zinc layer is etched out employing an electroforming technique thus leaving a spiral dewar 250.

The spiral dewar 250 shown in FIG. 4H also employs an embossed or folded burner structure 264 that wraps around reformer 32. FIGS. 4I and 4J illustrate wash coatings 266 on a wall 268 of burner 30 in accordance with two embodiments of the present invention. For the folded burner structure 264 of FIG. 4I, a wash coat 266 including the burner catalyst 104 is applied to both sides of wall 268.

A flat wall 270 suitable for use in spiral dewar 250 is shown in FIG. 4J. Flat wall 270 includes channels 272 etched or otherwise disposed along its surface. A wash coat 266 including the burner catalyst 104 is then added over the surface of flat wall 270 and channels 272.

Fuel processors 15 such as that shown in FIG. 4D are very well suited to contain internally generated heat. In one embodiment, burner 30 operates at a temperature greater than about 350 degrees Celsius and the outer side of the housing remains less than about 75 degrees Celsius. This facilitates the use of higher temperature burning fuel sources within burner 30 such as ethanol and propane, for example.

Dewars as shown in FIGS. 4A and 4D may be considered 'multipass' since the incoming air passes over multiple surfaces for convective heat transfer between the warmer surfaces and cooler air. The embodiment in FIG. 4A illustrates a two-pass system where the air passes through two dewar chambers, while the embodiment in FIG. 4D illustrates an N-pass where N is the number of dewar walls in a given radial direction from the fuel processor center.

Figure 4E:
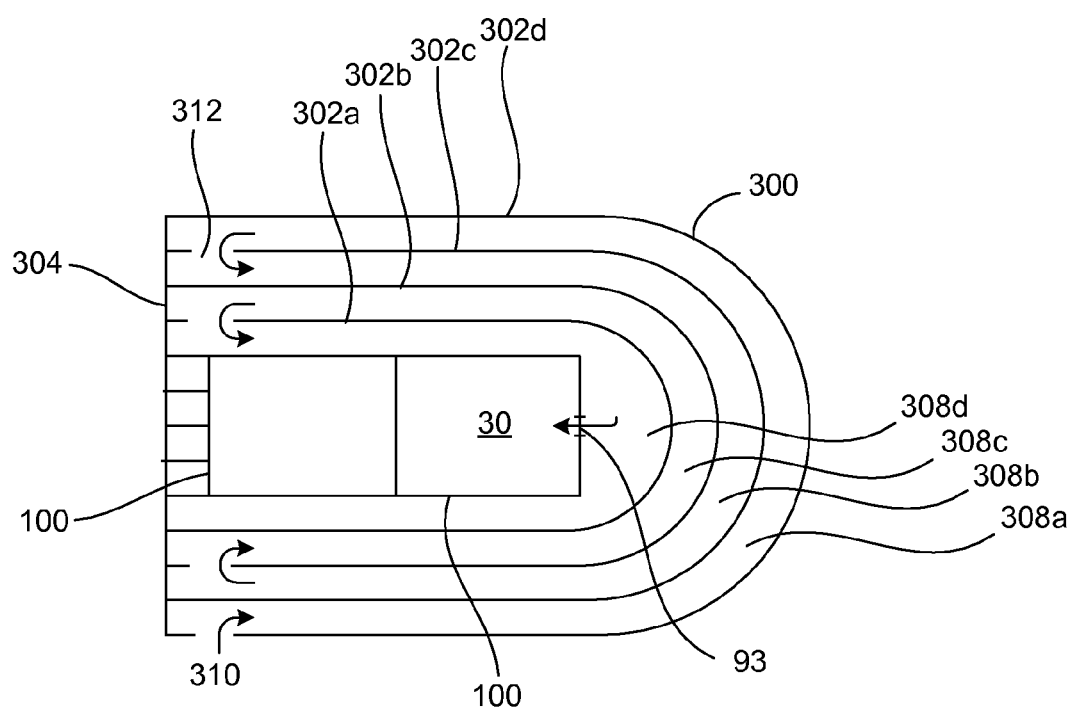
FIG. 4E illustrates a dewar in accordance with another embodiment of the present invention.

FIG. 4E illustrates a cross sectional view of a multipass dewar 300 in accordance with another embodiment of the present invention. Dewar 300 comprises four dewar walls 302*a-d* that connect to a housing wall 304. Dewar 300 partially contains monolithic structure 100. Dewar wall 302*a* cooperates with housing wall 304 to enclose monolithic structure 100, which includes burner 30. Dewar wall 302*b* and housing wall 304 enclose dewar wall 302*a* and burner 30. Similarly, dewar wall 302*c* and housing wall 304 enclose dewar wall 302*b*, while dewar wall 302*d* and housing wall 304 enclose dewar wall 302*c*. Dewar walls 302*a-d* form four volumes for incoming air to pass over warmer walls and receive heat. Air enters dewar inlet port 310 and flows through dewar chamber 308*a* and into dewar chamber 308*b* through port 312 after travelling through substantially the whole chamber 308*a*. Air then serially passes into and through chambers 308*c* and 308*d* before entering burner inlet 314.

Figure 4G:
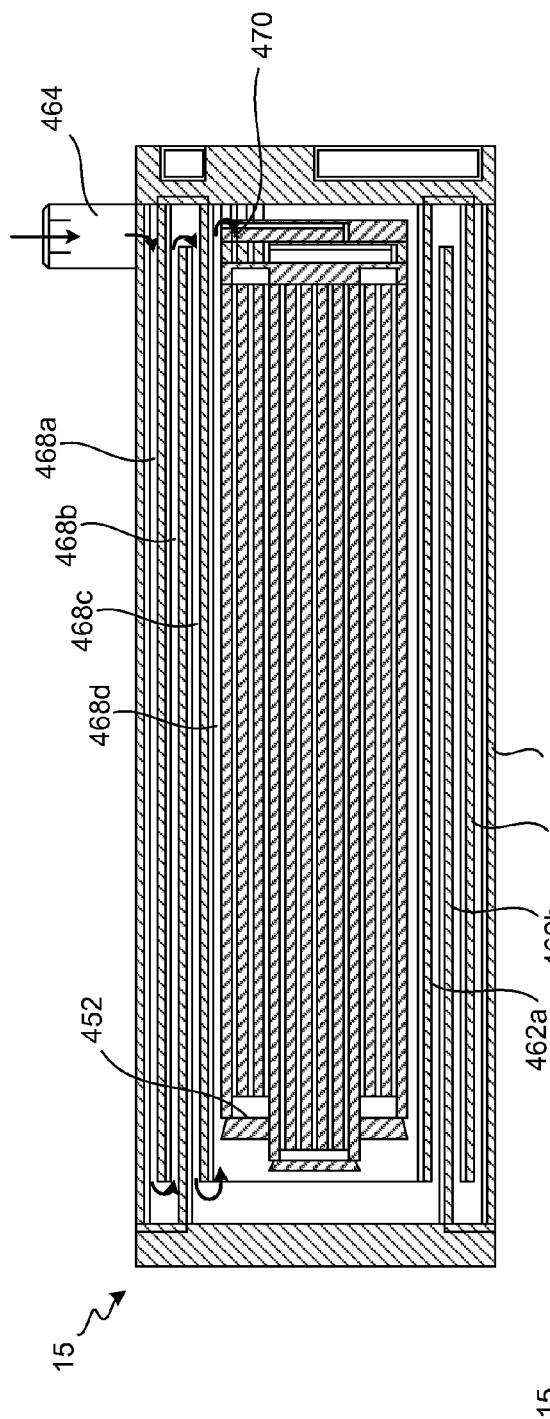
FIGS. 4F and 4G illustrate a cross section of a fuel processor including a monolithic structure and multipass dewar in accordance with another embodiment of the present invention.
Figure 4F:
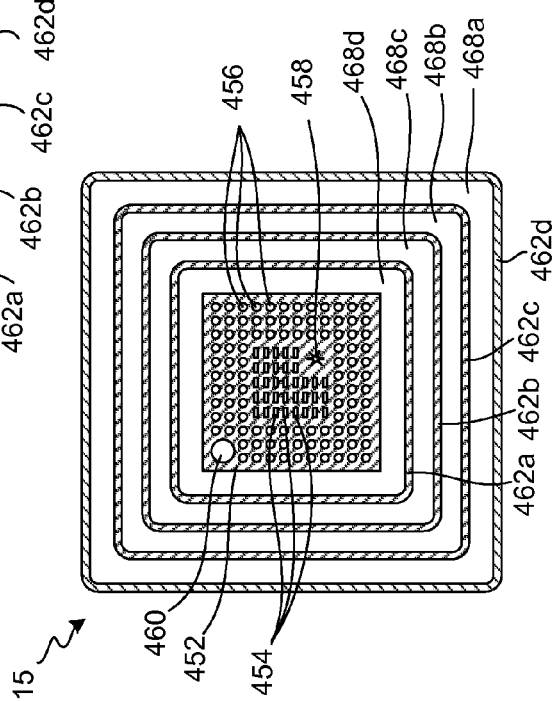
Figure 4H:
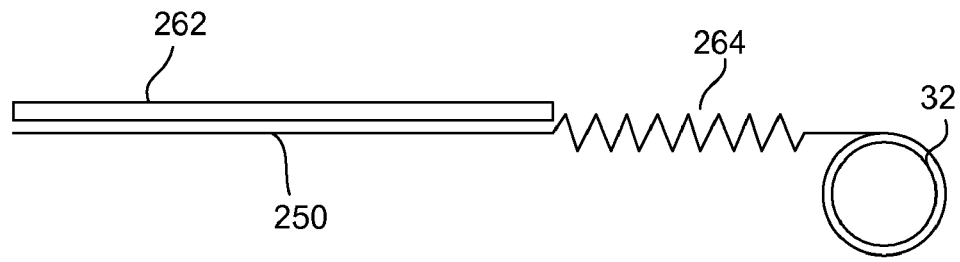
FIG. 4H illustrates spiral dewar in an unrolled form during initial construction in accordance with another embodiment of the present invention.
Figure 4I:
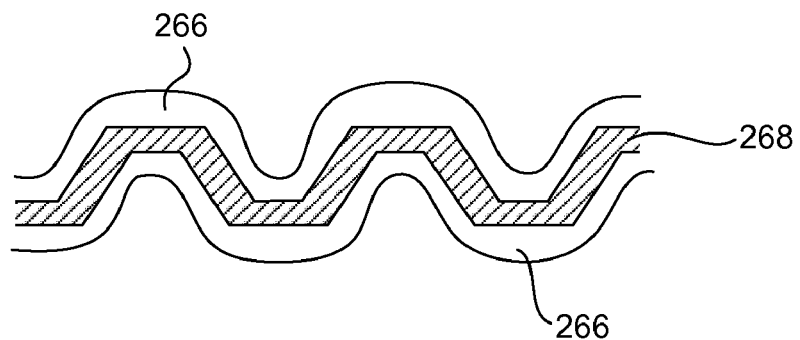
FIGS. 4I and 4J illustrate wash coatings on a wall of a burner in accordance with two embodiments of the present invention.
Figure 4J:
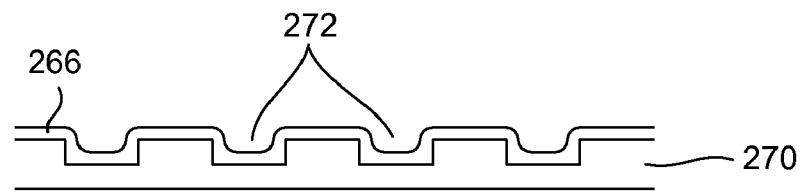

FIGS. 4F and 4G illustrate a cross section of a fuel processor 15 including a monolithic structure 452 and multipass dewar 450 in accordance with another embodiment of the present invention. Monolithic structure 452 includes multiple reformer chambers 454 that are disposed in a central portion of structure 452. Multiple burner chambers 456 surround and quadrilaterally border the reformer chambers 454. Reformer boiler 458 is arranged within the cross section of burner chambers 456, while burner boiler 460 is arranged in external portion of the cross section.

Dewar 462 comprises four dewar walls 462*a-d*. In the cross section shown in FIG. 4F, dewar wall 462*a* surrounds monolithic structure 452. Dewar wall 462*b* surrounds and encloses dewar wall 462*a*. Dewar wall 462*c* surrounds and encloses dewar wall 462*b*, while dewar wall 462*d* surrounds and encloses dewar wall 462*c*. Dewar walls 462*a-d* form four dewar volumes for incoming air to pass through and receive heat. As shown in FIG. 4G, air enters dewar inlet port 464 and flows through dewar chamber 468*a* and into dewar chamber 468*b* after traveling through substantially the whole chamber 468*a* along the length of monolithic structure 452. Air then serially passes from chamber 468*b* to chamber 468*c* and chamber 468*d* before entering burner inlet 470.

Figure 5:
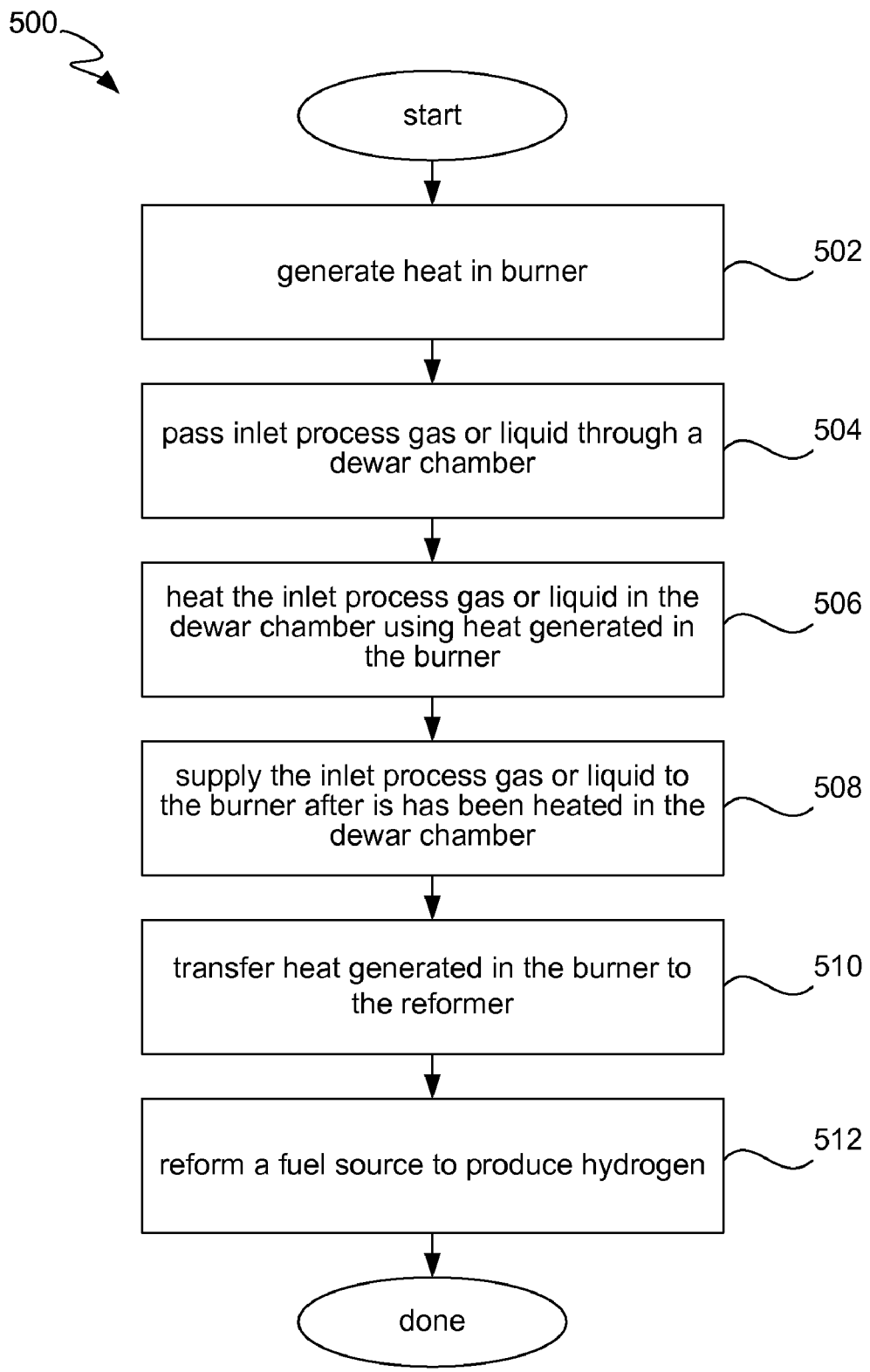
FIG. 5 illustrates a process flow for generating hydrogen in a fuel processor in accordance with one embodiment of the present invention.

FIG. 5 illustrates a process flow 500 for generating hydrogen in a fuel processor in accordance with one embodiment of the present invention. The fuel processor comprises a burner, a reformer and a dewar that at least partially contains the burner and reformer. Although the present invention has so far discussed dewars with respect to annular reformer and burner designs described herein, it is also anticipated that dewars described herein are also useful to contain heat in other reformer and burner designs. Many architectures employ a planar reformer disposed on top or below to a planar burner. Micro-channel designs fabricated in silicon commonly employ such stacked planar architectures and would benefit from dewars described herein.

Process flow 500 begins by generating heat in the burner (502). Catalytic burner architectures may include those described above or a micro-channel design on silicon. Further description of a micro-channel fuel processor suitable for use with the present invention is included in commonly owned co-pending patent application Ser. No. 10/877,804 and entitled "Planar Micro Fuel Processor" naming Ian Kaye as inventor and filed on Jun. 25, 2004. This application is incorporated by reference for all purposes. A catalyst in the burner facilitates heat generation in the presence of the heating fuel. The burner may also employ an electric burner that includes an resistive heating element that produces heat in response to input current.

Air enters a port for the dewar and passes through a dewar chamber (504). For the dewar of FIG. 4A, burner 30 and dewar 150 share a wall and the air passes through the dewar chamber 156 in a direction that at least partially counters a direction that the air passes through burner chamber 105.

The air is then heated in the dewar chamber using heat generated in the burner (506). Heat travels from burner 30 to dewar chamber 156 via conductive heat transfer. Heat may also travel from a burner to a dewar chamber via convective and/or radiative heat transfer. Once in the dewar chamber, the air is typically heated via convective heat transfer from a wall of the dewar to the air. In one embodiment, the dewar shares a wall with the burner and air in the dewar chamber is heated using heat from the shared wall. Heat from the burner wall may also travel to other walls in the dewar and heat air in the dewar chamber after the heat transfers from the shared wall to another non-shared dewar wall. Heat traveling between the shared wall and non-shared dewar wall transfer by conduction between connected walls or radiation between facing walls.

Process flow 500 then supplies the warmed air to the burner after it has been heated in the dewar chamber (508). Typically, the fuel processor includes an exit to the dewar chamber and an inlet to the burner—along with any intermittent plumbing—that allow the heated air to pass therebetween. For the fuel processor shown in FIG. 2A, space between dewar 150 and burner 30 at the ends of the burner route the air from the dewar to the burner.

The air is then used in the burner for catalytic combustion to generate heat. The generated heat is then transferred from the burner to the reformer (510). In the reformer, the heat is then used in reforming a fuel source to produce hydrogen (512).

The first three elements (502, 504, and 506) of process flow 500 also form a method of managing heat in a fuel processor. In this case, heat generated in the burner (502) passes to air in the dewar (504). The dewar 150 at least partially thermally isolates components internal to the fuel processor housing—such as the burner—and contains heat within the fuel processor. The dewar thus reduces heat loss from the fuel processor and helps manage the temperature gradient between the burner and outer surfaces of the housing. The dewar may also contain extended and/or multiple dewar chambers through which the air passes and is heated by heat generated in the burner. FIG. 4A illustrates a second dewar chamber 158 formed between the dewar and a housing for the fuel processor. Air passes first through chamber 158 then into dewar chamber 156. FIG. 4D illustrates a spiral dewar including an extended dewar chamber 408. In this case, dewar 250 includes one wall that increasingly provides heat as incoming air nears the burner. FIG. 4E illustrates a dewar 300 including four partially dewar chambers 308 where each dewar chamber heats incoming air in turn as it nears the burner. FIG. 4F illustrates a dewar including four annular and concentric and rectangular dewar chambers 408 that each heat incoming air in turn as it travels to the burner.

While this invention has been described in terms of several preferred embodiments, there are alterations, permutations, and equivalents that fall within the scope of this invention which have been omitted for brevity's sake. For example, although reformer 32 includes chamfered corners as shown in FIG. 3A, the present invention may employ non-chamfered corners in reformer 32. In addition, although the present invention has been described in terms of a monolithic structure 100 that forms the volumetric reformer 32, the present invention is not limited to volumetric reformers disposed in monolithic structures. It is therefore intended that the scope of the invention should be determined with reference to the appended claims.

What is claimed is:

1. A method for generating hydrogen in a fuel processor, the fuel processor comprising a burner, a reformer and a dewar that at least partially contains the burner and reformer, the method comprising:
    combusting a fuel source in the burner to generate heat in burner;
    transferring heat from the burner to a dewar chamber via conductive heat transfer using a wall shared by the dewar chamber and the burner;
    passing a process gas or liquid through the dewar chamber bordered by the wall shared by the dewar chamber and the burner;
    recycling the heat transferred from the burner back into the burner, wherein recycling comprises:
    heating the process gas or liquid in the dewar chamber using heat transferred to the dewar wall from the burner; and
    supplying the process gas to the burner or reformer by supplying pre-heated process gas from the dewar chamber directly to the burner after it has been heated in the dewar chamber to form a pre-heated gas or liquid;
    transferring heat generated in the burner to the reformer; and
    reforming the fuel source to produce hydrogen.

2. The method of claim 1 wherein the process gas or liquid passes through the dewar chamber in a direction that at least partially counters a direction that the process gas or liquid passes through the burner chamber.

3. The method of claim 1 wherein the combusting further comprises heating a heating element in the burner before combusting the fuel source.

4. The method of claim 1 wherein the fuel processor comprises a housing that contains the dewar.

5. The method of claim 4 further comprising:
    passing the process gas or liquid through a second dewar chamber before the dewar chamber receives the process gas or liquid, the second dewar chamber formed between the housing and the dewar wall; and
    heating the process gas or liquid in the second dewar chamber using heat generated in the burner.

6. The method of claim 5 wherein the heat generated in the burner transfers to a second dewar wall via radiative heat transfer from the wall shared by the dewar and the burner.

7. The method of claim 6 wherein the dewar includes a radiative layer disposed on the second wall that improves radiative heat reflectance of the second wall.

8. The method of claim 1 wherein heating the process gas or liquid comprises convective heat transfer between the shared wall and the process gas or liquid in the dewar chamber.

9. The method of claim 1 wherein the combusting further comprising:
    providing the fuel source to the burner; and
    combusting the fuel source using a burner catalyst contained in the burner chamber to generate heat.

10. The method of claim 9 further comprising conductively transferring heat generated from the burner catalyst to the wall shared by the dewar and the burner.

11. The method of claim 1 wherein the dewar comprises a wall that spirals in a cross section around the burner.

12. The method of claim 1 wherein the fuel processor includes a monolithic structure that includes a single material and forms a wall of a reformer chamber included in the reformer, a wall of a burner chamber included in the burner, and a wall of a dewar chamber included in the dewar.

13. A method for managing heat in a portable fuel cell system that includes a fuel processor, the fuel processor comprising a burner, a reformer and a dewar that at least partially contains the burner, the method comprising:
    combusting a fuel source in the burner to generate heat in a burner chamber;
    passing a process gas or liquid through a dewar chamber, wherein the dewar comprises a wall that spirals in a cross section around the burner; and
    heating the process gas or liquid in the dewar chamber using heat generated in the burner to form a pre-heated gas or liquid, wherein the burner operates at a temperature greater than about 200 degrees Celsius and wherein the dewar chamber is configured to progressively warm the process gas or liquid as it passes toward the burner, wherein an outer side of a wall of a housing, that at least partially contains the dewar, remains less than about 50 degrees Celsius during heat generation in the burner, and
    recycling heat from the burner back into the burner, wherein recycling comprises supplying pre-heated gas to the burner directly from the dewar chamber after it has been heated in the dewar chamber.

14. The method of claim 13, wherein the fuel processor is configured such that a wall of the burner is no greater than 10 millimeters from a nearest wall of the housing.

15. The method of claim 13, wherein the generating heat further comprises heating a heating element in the burner.

16. The method of claim 13 wherein the passing further comprises flowing the process gas or liquid through the dewar chamber in a direction that at least partially counters a flow direction of the process gas or liquid passing through the burner chamber.

17. The method of claim 13 further comprising:
    passing the process gas or liquid through the second dewar chamber before the dewar chamber receives the process gas or liquid, the second dewar chamber formed between the housing and the dewar wall; and
    heating the process gas or liquid in the second dewar chamber using heat generated in the burner.

18. The method of claim 13 wherein the burner comprises a catalyst wash coated on a wall of the burner.

19. The method of claim 13 wherein the fuel processor includes a monolithic structure that includes a single material and forms a wall of a reformer chamber included in the reformer, a wall of a burner chamber included in the burner, and a wall of a dewar chamber included in the dewar.

20. A method for generating hydrogen in a fuel processor, the fuel processor comprising a burner, a reformer and a dewar that at least partially contains the burner and reformer, the method comprising:
    combusting a fuel source in the burner to generate heat in burner;
    transferring heat from the burner to a dewar chamber via conductive heat transfer using a wall shared by the dewar chamber and the burner; passing a process gas or liquid through the dewar chamber bordered by the wall shared by the dewar chamber and the burner recycling the heat transferred from the burner back into the burner, wherein recycling comprises:

heating the process gas or liquid in the dewar chamber using heat transferred to the dewar wall from the burner to form a pre-heated gas or liquid; and supplying the process gas to the burner or reformer by supplying pre-heated process gas from the dewar chamber directly to the burner after it has been heated in the dewar chamber;

transferring heat generated in the burner to the reformer; and reforming the fuel source to produce hydrogen, wherein the fuel processor comprises a monolithic structure formed of a single material and wherein the monolithic structure is an integrated structure that forms a wall of a reformer chamber included in the reformer, a wall of a burner chamber included in the burner, and a wall of a dewar chamber included in the dewar, the monolithic structure formed by extrusion, casting, or sintering.

* * * * *